US009915576B2

(12) United States Patent
Fujita et al.

(10) Patent No.: US 9,915,576 B2
(45) Date of Patent: Mar. 13, 2018

(54) PRESSURE SENSOR AND PRESSURE DETECTION DEVICE

(71) Applicants: The University of Tokyo, Bunkyo-ku, Tokyo (JP); Kabushiki Kaisha Saginomiya Seisakusho, Nakano-ku, Tokyo (JP)

(72) Inventors: Hiroyuki Fujita, Tokyo (JP); Gen Hashiguchi, Tokyo (JP); Hiroyuki Mitsuya, Sayama (JP); Hisayuki Ashizawa, Sayama (JP)

(73) Assignees: The University of Tokyo, Tokyo (JP); Kabushiki Kaisha Saginomiya Seisakusho, Tokyo (JP)

( * ) Notice: Subject to any disclaimer, the term of this patent is extended or adjusted under 35 U.S.C. 154(b) by 85 days.

(21) Appl. No.: 15/031,574

(22) PCT Filed: Sep. 29, 2014

(86) PCT No.: PCT/JP2014/075921
§ 371 (c)(1),
(2) Date: Apr. 22, 2016

(87) PCT Pub. No.: WO2015/060071
PCT Pub. Date: Apr. 30, 2015

(65) Prior Publication Data
US 2016/0282209 A1 Sep. 29, 2016

(30) Foreign Application Priority Data
Oct. 25, 2013 (JP) .................................. 2013-222151

(51) Int. Cl.
*G01L 9/10* (2006.01)
*G01L 9/12* (2006.01)
*G01L 9/00* (2006.01)

(52) U.S. Cl.
CPC .................................. *G01L 9/0016* (2013.01)

(58) Field of Classification Search
CPC . G01L 9/00; G01L 9/0016; G01L 9/10; G01L 9/12; G01L 9/14; G01L 9/16; G01L 11/00
See application file for complete search history.

(56) References Cited

U.S. PATENT DOCUMENTS

| 2011/0221312 A1 | 9/2011 | Nishizawa |
| 2011/0255228 A1* | 10/2011 | Kimura ..................... G01D 5/24 |
| | | 361/679.01 |
| 2012/0060607 A1 | 3/2012 | Yoshida |

FOREIGN PATENT DOCUMENTS

| CN | 102195601 A | 9/2011 |
| CN | 102401693 A | 4/2012 |

(Continued)

OTHER PUBLICATIONS

International Search Report (PCT/ISA/210) issued in PCT Application No. PCT/JP2014/075921 dated Dec. 2, 2014 with English translation (five pages).

(Continued)

*Primary Examiner* — Nguyen Ha
(74) *Attorney, Agent, or Firm* — Crowell & Moring LLP

(57) ABSTRACT

A pressure sensor includes: a fixed part; a ring-like oscillator that is supported on the fixed part by a plurality of support beams; a plurality of electrodes that are provided on the fixed part and arranged in an oscillating direction of the ring-like oscillator with a gap; electret films that are formed on either one of opposite surfaces of the ring-like oscillator and the electrodes.

16 Claims, 19 Drawing Sheets

(56) References Cited

FOREIGN PATENT DOCUMENTS

| CN | 103335751 A | 10/2013 | | |
|---|---|---|---|---|
| JP | 2000-28444 A | 1/2000 | | |
| JP | 2006-47193 A | 2/2006 | | |
| JP | 2006-165998 A | 6/2006 | | |
| JP | 2007-240449 A | 9/2007 | | |
| JP | 2008076106 A | * | 4/2008 | ............... G01L 9/12 |
| JP | 4696244 B2 | 6/2011 | | |
| JP | 2011-183539 A | 9/2011 | | |
| JP | 2012-58127 A | 3/2012 | | |
| JP | 2013-13256 A | 1/2013 | | |
| WO | WO 2006/025211 A1 | 3/2006 | | |

OTHER PUBLICATIONS

Japanese-language Written Opinion (PCT/ISA/237) issued in PCT Application No. PCT/JP2014/075921 dated Dec. 2, 2014 (four pages).
Sugiyama et al., "SiO$_2$ Electret Generated by Potassium Ions on a Comb-Drive Actuator", Applied Physics Express 4, 2011, pp. 114103-1-114103-3, Research Institute of Electronics, Shizuoka University et al., Hamamatsu, Japan.

\* cited by examiner

FIG.13
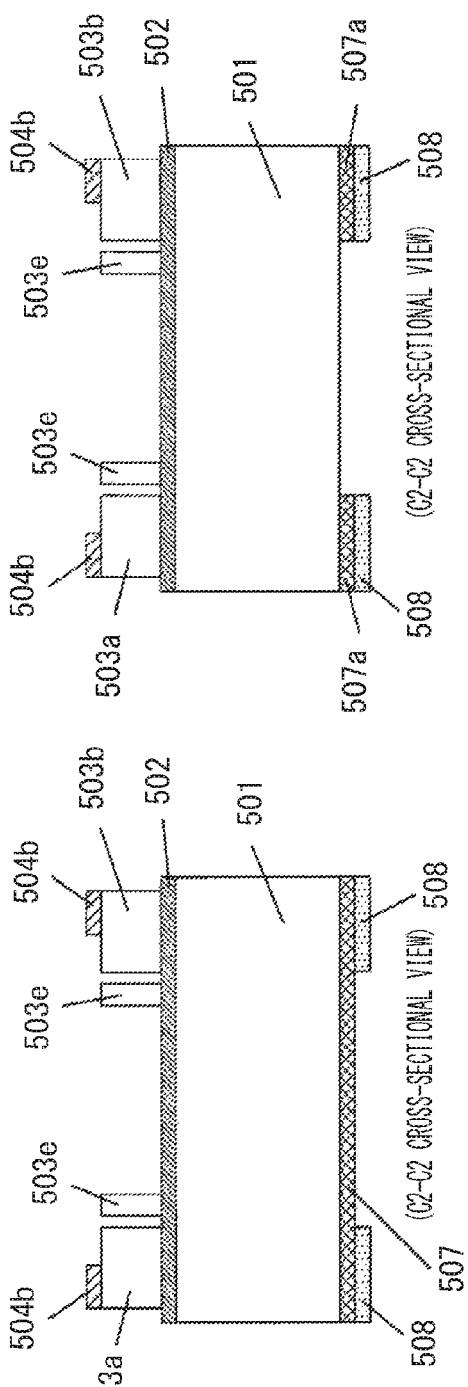
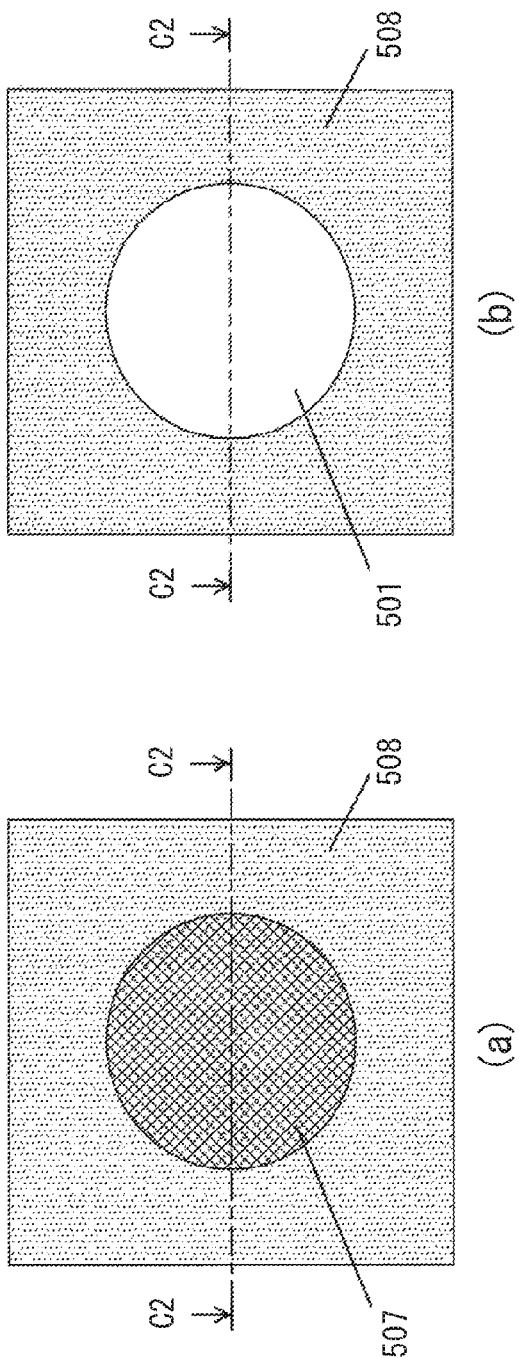

FIG.15

| 1 | OXIDATION TEMPERATURE | 930°C |
| --- | --- | --- |
| 2 | OXIDATION FILM THICKNESS/OXIDATION TIME | 1 μm/30 h |
| 3 | KOH AQUEOUS SOLUTION CONCENTRATION | 40 wt% |
| 4 | BIAS VOLTAGE | up to ca. 300 V |
| 5 | TEMPERATURE | (not less than 650°C) |
| 6 | PROCESSING TIME | 30 min. |

PRESSURE SENSOR AND PRESSURE DETECTION DEVICE

TECHNICAL FIELD

A pressure sensor utilizing viscous drag of gas, and a pressure detection device comprising the pressure sensor.

BACKGROUND ART

Conventionally, a diaphragm-type pressure sensor such as described in PTL1 is known as a compact pressure sensor. The diaphragm-type pressure sensor detects a difference in pressures applied to both front and back sides of the diaphragm as deformation of the diaphragm. However, this type of pressure sensor has a problem of damaging the diaphragm when an excessive pressure is applied thereto.

As a pressure sensor that solves such a disadvantage of the diaphragm-type pressure sensor, a pressure sensor utilizing viscous drag of gas has been proposed see PTL2). The pressure sensor causes a movable comb to oscillate in relation to a fixed comb and detects pressure by utilizing viscous drag of gas between the combs.

CITATION LIST

Patent Literature

PTL1: Japanese Laid-Open Patent Publication No. 2006-47193
PTL2: Japanese Patent No. 4696244

SUMMARY OF INVENTION

Technical Problem

In the pressure sensor described in PTL2, a comb driving mechanism is used as a driving mechanism. It is thus required to apply a high direct current bias voltage between a driving electrode and a movable electrode by the use of a direct current power source, in addition to an alternating current voltage for driving. Therefore, as one problem, a reduction in power consumption is difficult. In addition, in the comb driving mechanism, squeeze film damping having a higher damping effect cannot be utilized because the movable comb electrode is driven in the insertion/removal direction in relation to the fixed comb electrode. For this reason, in the pressure sensor described in PTL2, a damping mechanism that generates the squeeze film damping is provided aside from the comb driving mechanism in order to utilize the squeeze film damping and the damping mechanism is driven by the comb driving mechanism. Consequently, there is a disadvantage of an increase in size of the pressure sensor itself.

Solution to Problem

According to the 1st aspect of the present invention, a pressure sensor comprises: a fixed part; a ring-like oscillator that is supported on the fixed part by a plurality of support beams; a plurality of electrodes that are provided on the fixed part and arranged in an oscillating direction of the ring-like oscillator with a gap; electret films that are formed on either one of opposite surfaces of the ring-like oscillator and the electrodes.

According to the 2nd aspect of the present invention, in the pressure sensor according to the 1st aspect, it is preferred that the ring-like oscillator has an annular shape.

According to the 3rd aspect of the present invention, in the pressure sensor according to the 1st or 2nd aspect, it is preferred that: the support beams support pails where nodes of oscillation of the ring-like oscillator appear; and the plurality of electrodes are arranged to be opposite to parts that antinodes of oscillation of the ring-like oscillator appear.

According to the 4th aspect of the present invention, a pressure detection device comprises the pressure sensor according to any one of the 1st to 3rd aspects, wherein: the plurality of electrodes provided in the pressure sensor include two or more driving electrodes and one or more detecting electrode; there is provided a power source that applies an alternating current voltage to the driving electrodes; and there is provided a pressure calculating unit that detects a voltage signal due to oscillation of the ring-like oscillator generated in the detecting electrode and outputs pressure information based on the voltage signal.

According to the 5th aspect of the present invention, in the pressure detection device according to the 4th aspect, it is preferred that: the power source applies an alternating current voltage in a predetermined frequency range to the driving electrodes; and the pressure calculating unit outputs a difference between a level of the voltage signal detected in a resonance state and a level of the voltage signal detected in a non-resonance state as the pressure information.

According to the 6th aspect of the present invention, a pressure detection device comprises the pressure sensor according to any one of the 1st to 3rd aspects; a power source that applies an alternating current voltage to the plurality of electrodes; and a pressure calculating unit that detects an admittance of an electromechanically coupled system including the pressure sensor to which the alternating current voltage is applied and outputs pressure information based on a value of the detected admittance.

Advantageous Effects of Invention

According to the present invention, a lower power consumption can be achieved in comparison to conventional pressure sensors utilizing viscous drag.

BRIEF DESCRIPTION OF DRAWINGS

FIG. 13 is a view explaining eighth and ninth steps in the method of manufacturing the pressure sensor 2.

FIG. 15 is a view showing one example of electret film manufacturing conditions.

DESCRIPTION OF EMBODIMENTS

Figure 1:
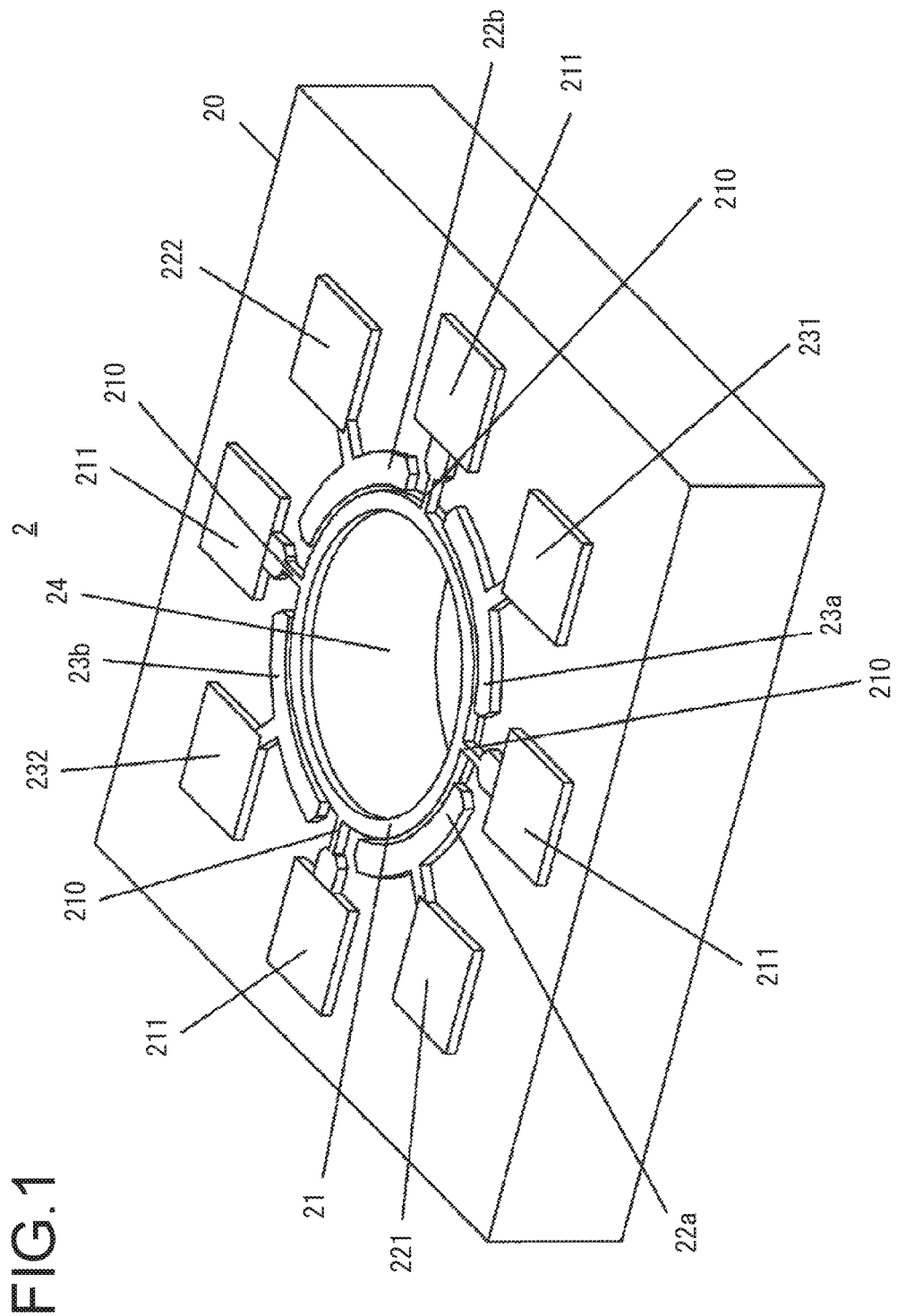
FIG. 1 is a perspective view showing one embodiment of a pressure sensor according to the present invention.
Figure 2:
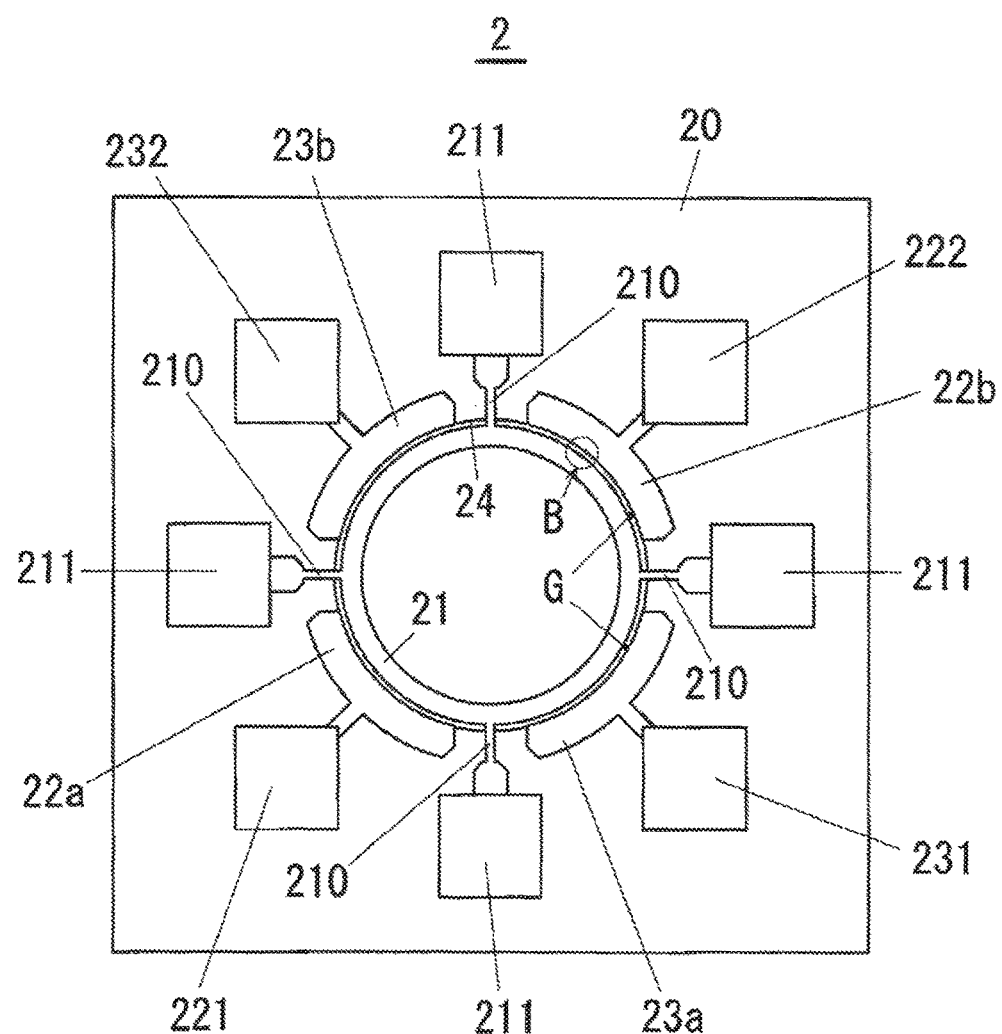
FIG. 2 is a plan view of the pressure sensor 2.

Referring to the drawings, embodiments of the present invention will now be described. FIGS. 1 and 2 are views showing one embodiment of a pressure sensor according to the present invention. FIG. 1 is a perspective view of the pressure sensor and FIG. 2 is a plan view thereof. The pressure sensor 2 is formed by manufacturing means of MEMS (Micro Electro Mechanical Systems) as described hereinafter.

The pressure sensor 2 includes a base 20, a ring oscillator 21, driving electrodes 22a, 22b, and detecting electrodes 23a, 23b. A circular through hole 24 is formed in the base 20. The annular ring oscillator 21 is arranged above the through hole 24 and fastened on the base 20 with four beams 210. A pad 211 for connecting wirings is formed on each beam 210.

On the outer circumferential side of the ring oscillator 21, the driving electrodes 22a, 22b and the detecting electrodes 23a, 23b are arranged to be opposite to and face to the outer circumferential side surface of the ring oscillator 21 with a gap G therebetween. The driving electrodes 22a, 22b are formed on the base 20 so as to sandwich the ring oscillator 21 therebetween. Side surfaces of the driving electrodes 22a, 22b are opposite to and face the side surface of the ring oscillator 21, with the gap G therebetween. Pads 221, 222 for connecting wirings are formed on the driving electrodes 22a, 22b, respectively.

Similarly, the detecting electrodes 23a, 23b are formed on the base 20 so as to sandwich the ring oscillator 21 therebetween and side surfaces of the detecting electrodes 23a, 23b are opposite to and face to the side surface of the ring oscillator 21 with a gap G therebetween. Pads 231, 232 for connecting wirings are formed on the detecting electrodes 23a, 23b. The driving electrodes 22a, 22b and the detecting electrodes 23a, 23b are arranged with an offset by an angle of 90 degrees to each other around the center of the ring oscillator 21.

Figure 3:
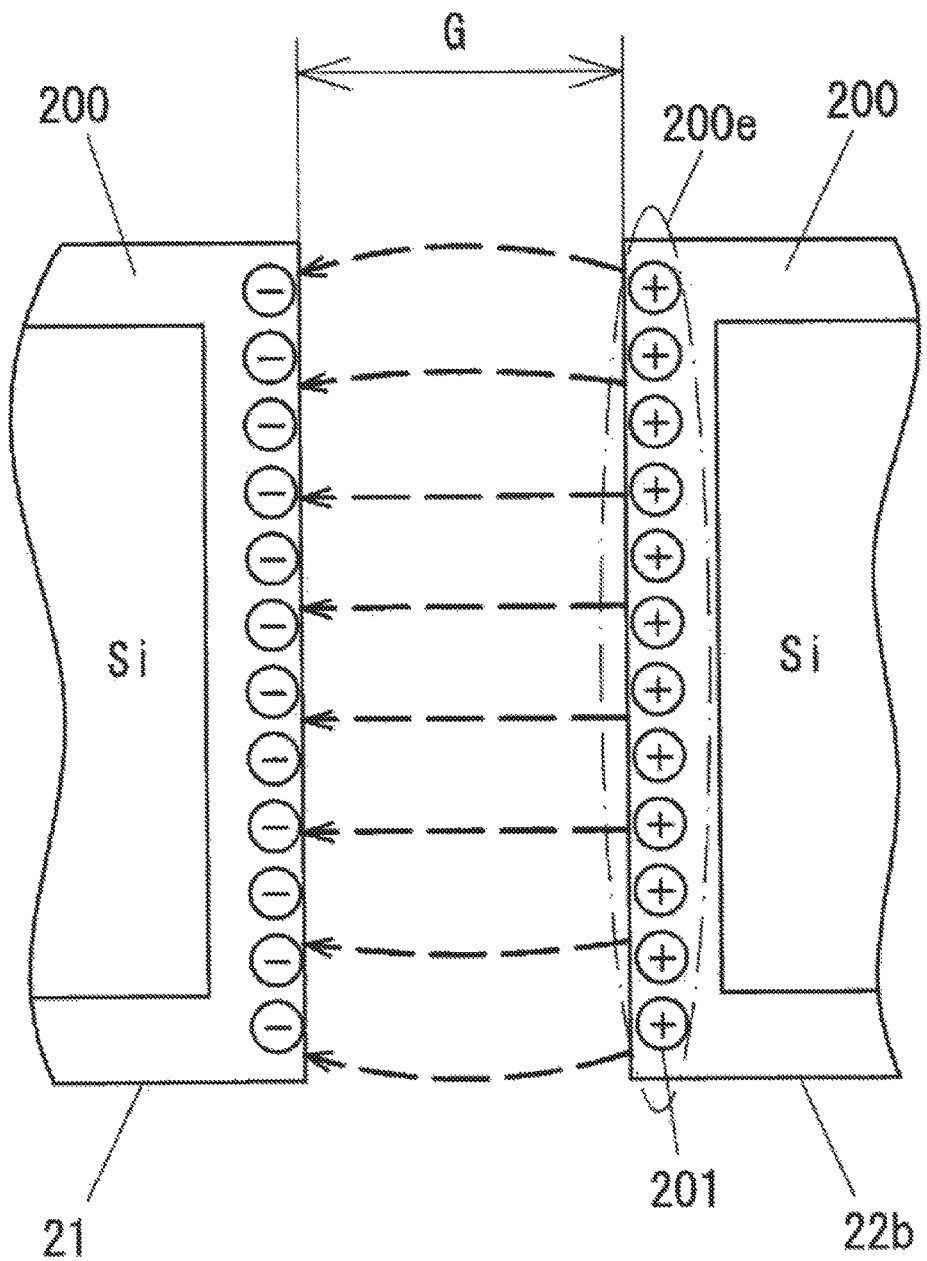
FIG. 3 is a cross-sectional view showing opposite parts of the ring oscillator 21 and the driving electrode 22b.

In the pressure sensor 2 in this embodiment, electret films (electret layers) are formed on the side surfaces of the electrodes 22a, 22b, 23a, 23b (i.e. the surfaces opposite to the ring oscillator 21). FIG. 3 is a cross-sectional view of a part that is denoted by reference symbol B in FIG. 2, i.e. a cross-sectional view of opposite parts of the ring oscillator 21 and the driving electrode 22b.

As described hereinafter, a $SiO_2$ film (layer) 200 containing potassium ions is formed on the surfaces of the ring oscillator 21 and the driving electrode 22b, which are made of Si. The $SiO_2$ film 200 on the electrode side (designated by one dot chain line 200e) is further made into an electret by being subjected to a B-T procedure (Bias Temperature procedure). In the $SiO_2$ film 200 that has been made into an electret, potassium ions 201 are distributed on the surface opposite to the ring oscillator 21. The $SiO_2$ film 200 that has been made into an electret will be hereinafter referred to as an electret film 200e. On the other hand, negative charges are induced on the side surface of the ring oscillator 21 by an electric field of the electret film 200e.

For example, when a dimension of the gap G was set to 2 pm, an electric field strength of approximately $1 \times 10$ s V/m is generated by the electret film 200e. This means that a potential difference of approximately 200V is generated between the ring oscillator 21 and the electrodes 22a, 22b, 23a, 23b.

(Driving of Ring Oscillator)

Figure 4:
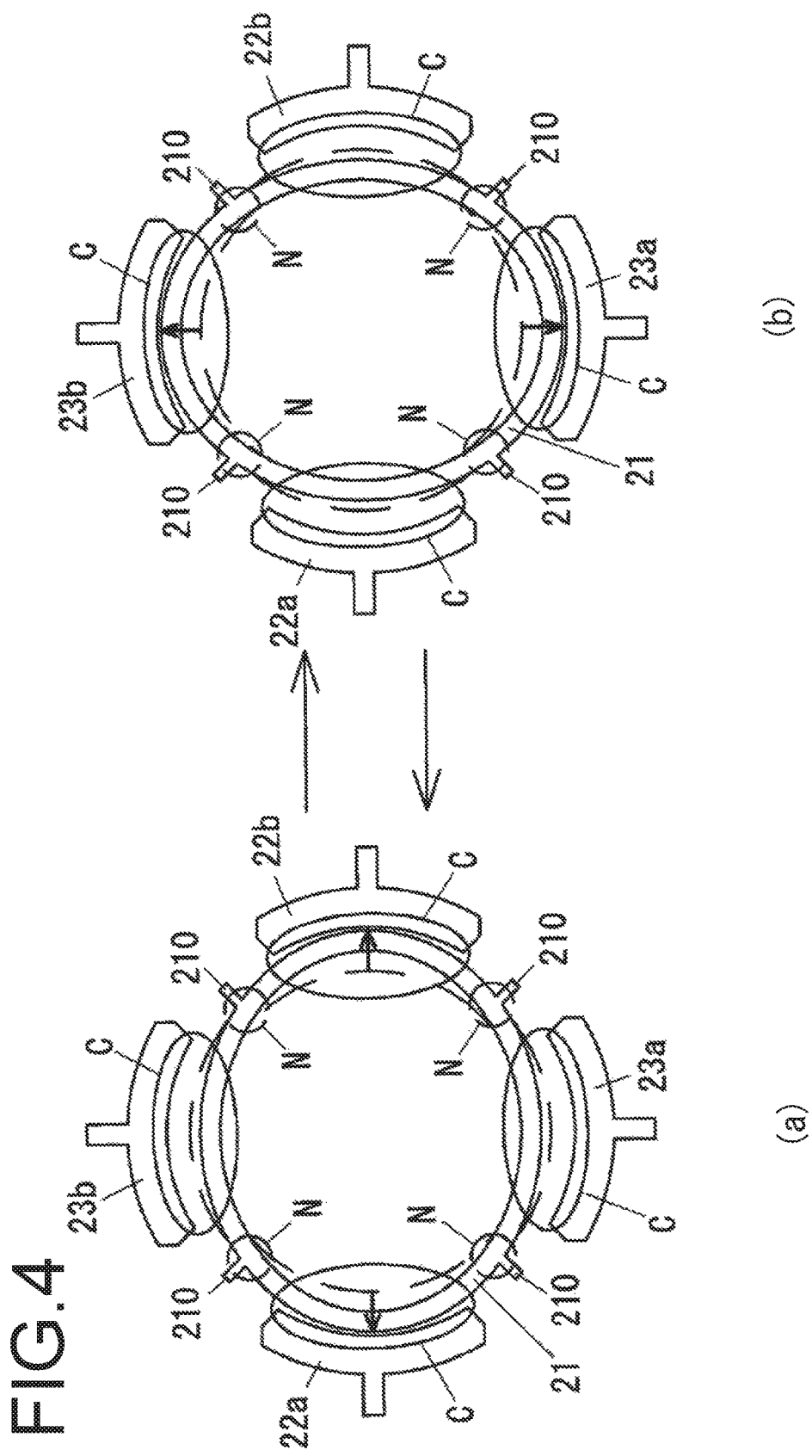
FIG. 4 is a view explaining oscillation of the ring oscillator 21.

In the pressure sensor 2 in this embodiment, an alternating current voltage is applied to the driving electrodes 22a, 22b to generate oscillation as shown in FIG. 4. The oscillation shown in FIG. 4 indicates a secondary oscillation mode of the ring oscillator 21, wherein a state in which the gap between the ring oscillator 21 and the driving electrodes 22a, 22b is narrower as shown in FIG. 4(a) (hereinafter referred to as a first oval shape) and a state in which the gap between the ring oscillator 21 and the driving electrodes 22a, 22b is wider as shown in FIG. 4(b) (hereinafter referred to as a second oval shape) are periodically repeated. Each of the beams 210 described above is connected to a position of a node (fixed point) N of the oscillation in the secondary oscillation mode.

In order to electrostatically drive and excite the ring oscillator 21 as shown in FIG. 4, conventionally it is necessary to apply the alternating current voltage and a direct current voltage, which is referred to as a bias voltage, to the driving electrodes 22a, 22b. The direct current bias voltage serves to couple a mechanical system and an electrical system. A force factor that represents the coupling becomes larger as the bias voltage becomes higher. The force factor indicates the degree of energy conversion between electrical energy and mechanical energy during oscillation of the ring oscillator 21. In order to excite the ring oscillator 21 as a pressure sensor, conventionally it is necessary to apply the bias voltage of approximately 200 to 300 V, depending on a diameter dimension, a width dimension, a gap dimension, and the like of the ring oscillator 21.

Although the conventional pressure detection device described above is configured to apply the bias voltage and the alternating current voltage from outside by the use of a direct current power source and an alternating current power source, the device in this embodiment of the present invention is configured to form the electret film 200e on the electrode side to apply the bias voltage therewith. It will be noted that the electret film may be formed on the ring oscillator side. By forming the electret film in this manner, it is not necessary to apply the direct current voltage from outside, which can result in a lower power consumption in comparison to conventional pressure sensors utilizing viscous drag (viscous resistance).

(Pressure Detecting Principle)

Pressure detection with the pressure sensor 2 in this embodiment will now be described. As shown in FIG. 4, the excited ring oscillator 21 deforms to alternately take the first oval shape and the second oval shape, with four points supported by the beams 210 being fixed points. In this case, fluid (in this case, gas) between the ring oscillator 21 and the driving electrodes 22a, 22b as well as the detecting electrodes 23a, 23b exerts squeeze film damping on the oscillation of the ring oscillator 21.

The squeeze film damping means a damping action that acts when the fluid between surfaces is squeezed or when the surfaces move away from each other to draw the fluid into a gap between them. The damping action consists of two components: one is viscous damping that is a component proportional to speed and the other is elastic damping that is a component proportional to displacement. In the example shown in FIG. 4, the squeeze film damping effect occurs at all (four) points C of the driving electrodes 22a, 22b and the detecting electrodes 23a, 23b.

Figure 5:
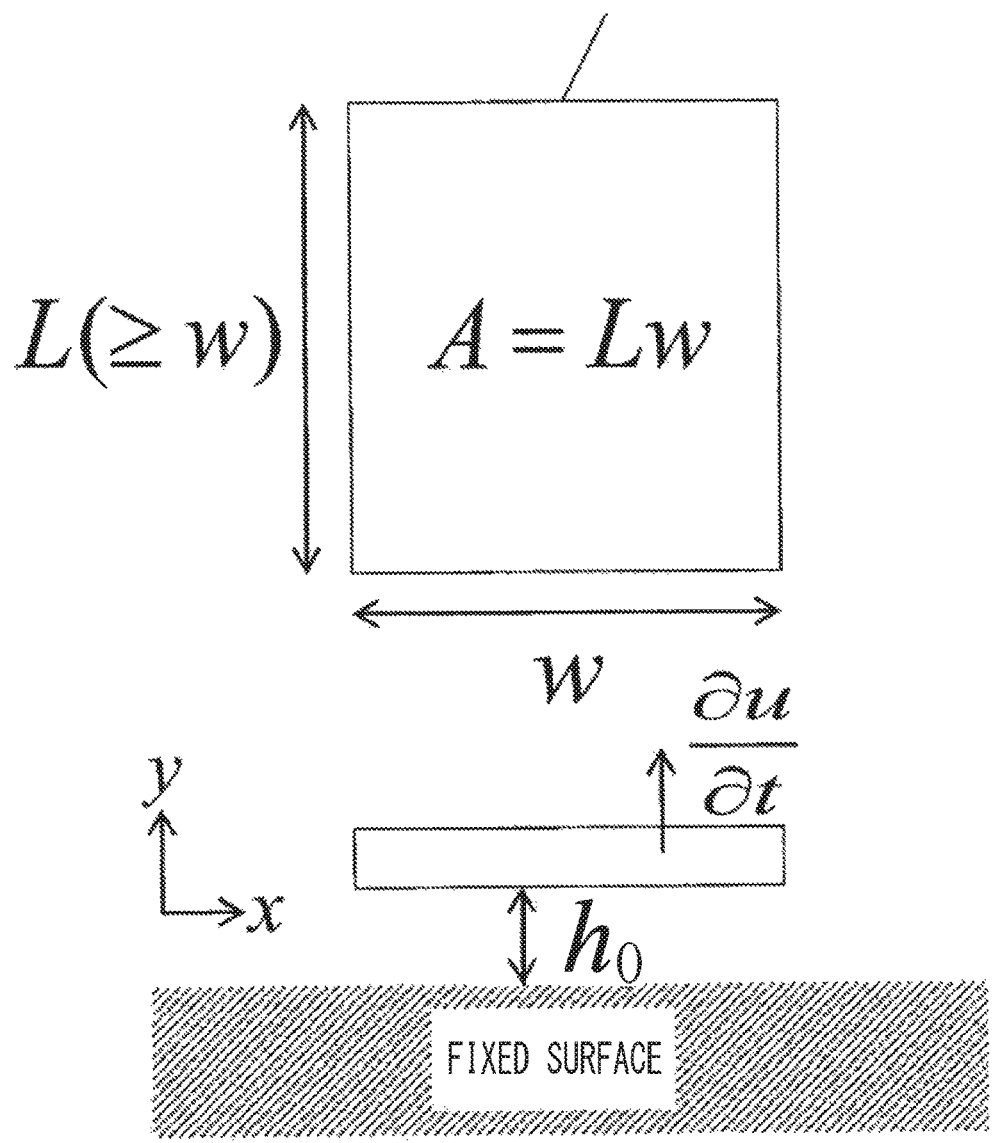
FIG. 5 is a view explaining squeeze film damping.

The viscous damping and the elastic damping described above can be determined by analytically solving a Reynolds equation. For example, assuming a model in which a flat plate having an area A (=L×w) displaces in the y direction in relation to a fixed surface as shown in FIG. 5, a (linearized) Reynolds equation under an isothermal condition is represented by the following equation (1). A boundary condition is represented by the equation (2). $\Delta p$ is small change in pressure, $p_a$ is time-averaged ambient pressure, u is displacement in an oscillating direction of the flat plate, and $h_0$ is gap dimension (during no oscillation).

$$\frac{\partial^2(\Delta p)}{\partial x^2} + \frac{\partial^2(\Delta p)}{\partial y^2} = \frac{12\mu}{h_0^2}\frac{\partial}{\partial t}\left[\frac{\Delta p}{p_a} + \frac{u}{h_0}\right] \quad (1)$$

$$\Delta p\left(-\frac{w}{2}\right) = \Delta p\left(\frac{w}{2}\right) = \Delta p\left(-\frac{L}{2}\right) = \Delta p\left(\frac{L}{2}\right) = 0 \quad (2)$$

By analytically solving the equation (1) with a solution involving a Green's function, the viscous damping $r_f$ is represented by the following equation (3) and the elastic damping $k_f$ is represented by the following equation (4). It will be noted that r=w/L, σ is squeeze number, and ω is angular frequency of the ring oscillator in the equations (3) and (4). The squeeze number σ is represented by the following equation (5) using a viscosity μ of the fluid.

$$r_f = \frac{F_{viscous}}{V} = \frac{64\sigma p_a A}{\omega\pi^6 h_0} \sum_{m,n \in odd} \frac{m^2 + (rn)^2}{(mn)^2[\{m^2 + (rn)^2\}^2 + \sigma^2/\pi^4]} \quad (3)$$

$$k_j = \frac{F_{elastic}}{X} = \frac{64\sigma^2 p_a A}{\pi^8 h_0} \sum_{m,n \in odd} \frac{m^2 + (rn)^2}{(mn)^2[\{m^2 + (rn)^2\}^2 + \sigma^2/\pi^4]} \quad (4)$$

$$\sigma = \frac{12\mu\omega L^2}{p_a h_0^2} \quad (5)$$

Here, given a gap dimension h between the ring oscillator 21 and the driving electrodes 22a, 22b as well as the detecting electrodes 23a, 23b, the Knudsen number $K_n$ is represented by the following equation (6). With the Knudsen number $K_n$, the viscosity μ of the fluid (physical property value) in the equation (5) can be replaced by an effective viscosity $\mu_{eff}$ of the squeeze film damping represented by the following equation (7) The squeeze number $\sigma_{eff}$ in this case is represented by the following equation (8).

$$K_n = \frac{\lambda}{h} \quad (6)$$

$$\mu_{eff} = \frac{\mu}{1 + 9.658 K_n^{1.159}} \quad (7)$$

$$\sigma_{eff} = \frac{12\mu_{eff}\omega L^2}{p_a h_0^2} \quad (8)$$

Because a mean free path λ in the equation (6) is inversely proportional to the pressure p of the fluid, the squeeze number $\sigma_{eff}$ represented by the equation (8) is a function of the pressure p. In other words, it can be found that the viscous damping represented by the equation (3) and the elastic damping represented by the equation (4) also vary as the pressure p varies. As a result, variations in the pressure p affect the oscillating condition of the ring oscillator 21. Both equations (3) and (4) include the area A. The larger the area A, the larger the damping effect. In the example shown in FIG. 4, because most of the whole outer side surface of the ring oscillator 21, except for the fixed points, is opposite and faces to the driving electrodes 22a, 22b and the detecting electrodes 23a, 23b with the gap G therebetween, variations in the pressure can be effectively considered as variations in the damping.

Figure 6:
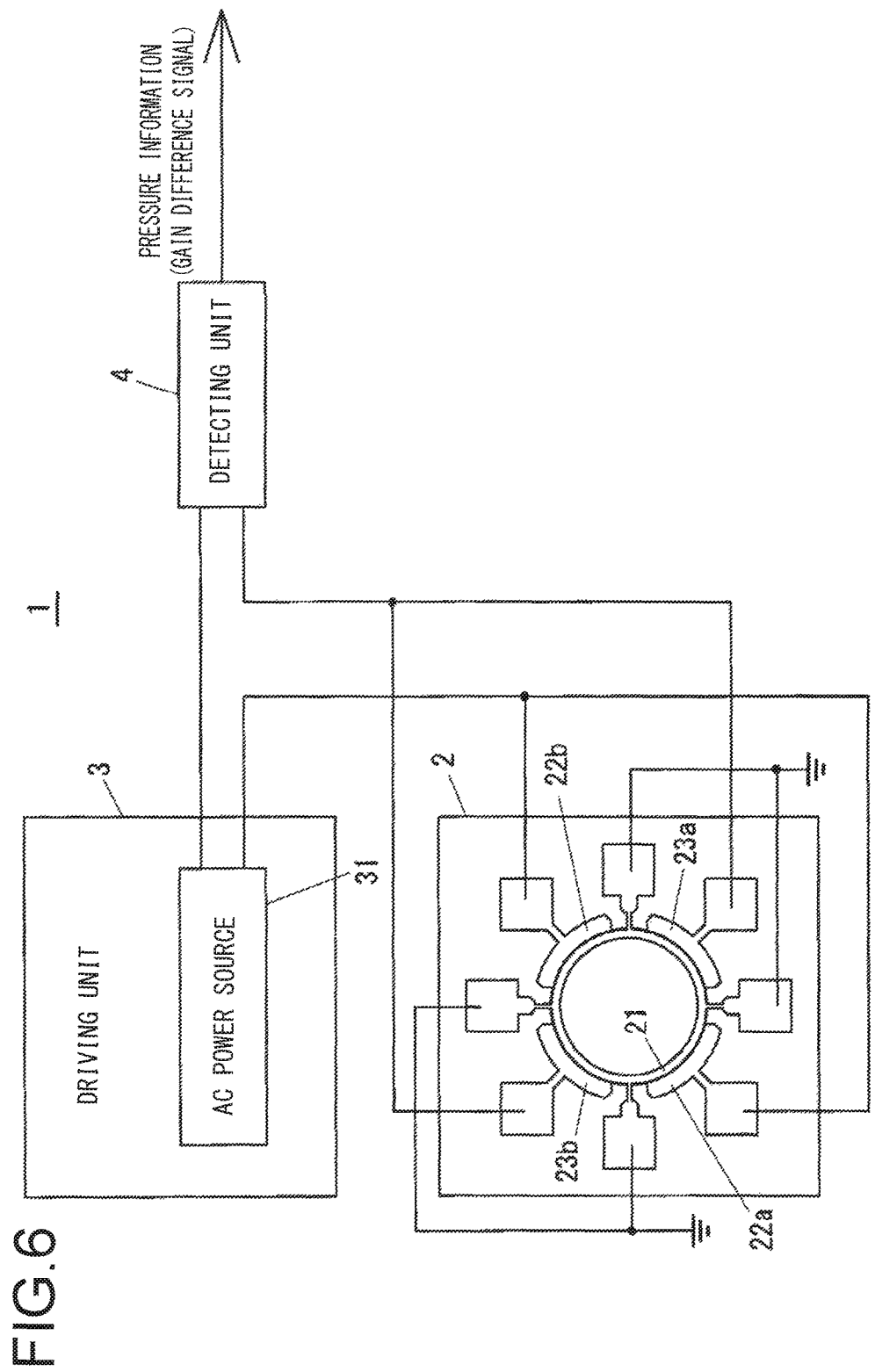
FIG. 6 is a block view showing one embodiment of a pressure detection device.

FIG. 6 is a block view showing a schematic configuration of the pressure detection device 1 including the above-described pressure sensor 2. The pressure detection device 1 includes the pressure sensor 2, a driving unit 3, and a detecting unit 4. An alternating current power source 31 provided in the driving unit 3 applies an alternating current voltage to the driving electrodes 22a, 22b of the pressure sensor 2. The alternating current voltage is also input to the detecting unit 4. The detecting electrodes 23a, 23b of the pressure sensor 2 are connected to the detecting unit 4. The oscillation ring 21 of the pressure sensor 2 is connected to a ground potential.

When the alternating current voltage is applied from the alternating current power source 31 to the driving electrodes 22a, 22b, the ring oscillator 21 is electrostatically driven to oscillate. When the ring oscillator 21 oscillates, an alternating current voltage signal in accordance with the oscillation is generated in the detecting electrodes 23a, 23b. The alternating current voltage signal detected at the detecting electrodes 23a, 23b is input to the detecting unit 4. The detecting unit 4 calculates a gain that is a ratio of the alternating current voltage signal detected in the detecting electrodes 23a, 23b and the alternating current voltage signal input from the alternating current power source 31.

Figure 7:
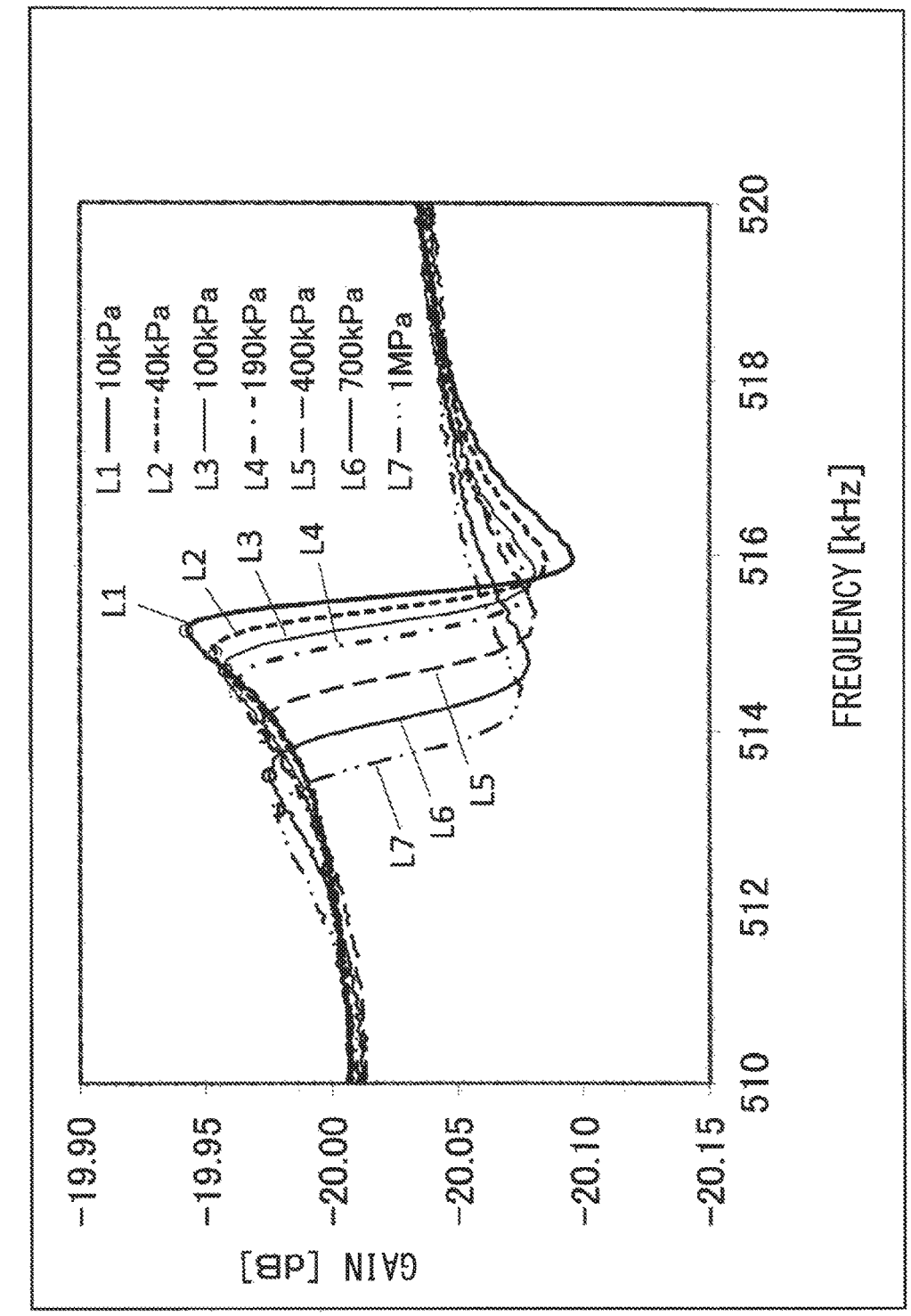
FIG. 7 is a view showing gain characteristics.

FIG. 7 is a graph showing gain characteristics, in which the vertical axis is gain (dB) and the horizontal axis is frequency of applied alternating current voltage (kHz). It will be noted that here an alternating current voltage of 4 $V_{P-P}$ was applied by the alternating current power source 31. FIG. 7 shows variations in gain characteristics with varying pressure (absolute pressure) of gas air) of 10 kPa (line L1), 40 kPa (line L2), 100 kPa (line L3), 190 kPa (line L4), 400 kPa (line L5), 700 kPa (line L6), and 1 MPa (line L7).

It can be found from comparison of resonance peaks (denoted by circles) with each other that the resonance peak is the largest in the case of 10 kPa which is the lowest pressure and the resonance peak becomes smaller as the pressure increases. In other words, dissipation of the oscillation energy due to the squeeze film damping becomes larger as the pressure becomes higher. The larger the amount of charge of the electret film 200e and/or the narrower the gap the sharper the resonance peak shown in FIG. 7. The sharper resonance peak allows a change in pressure to be detected with a higher sensitivity.

Figure 8:
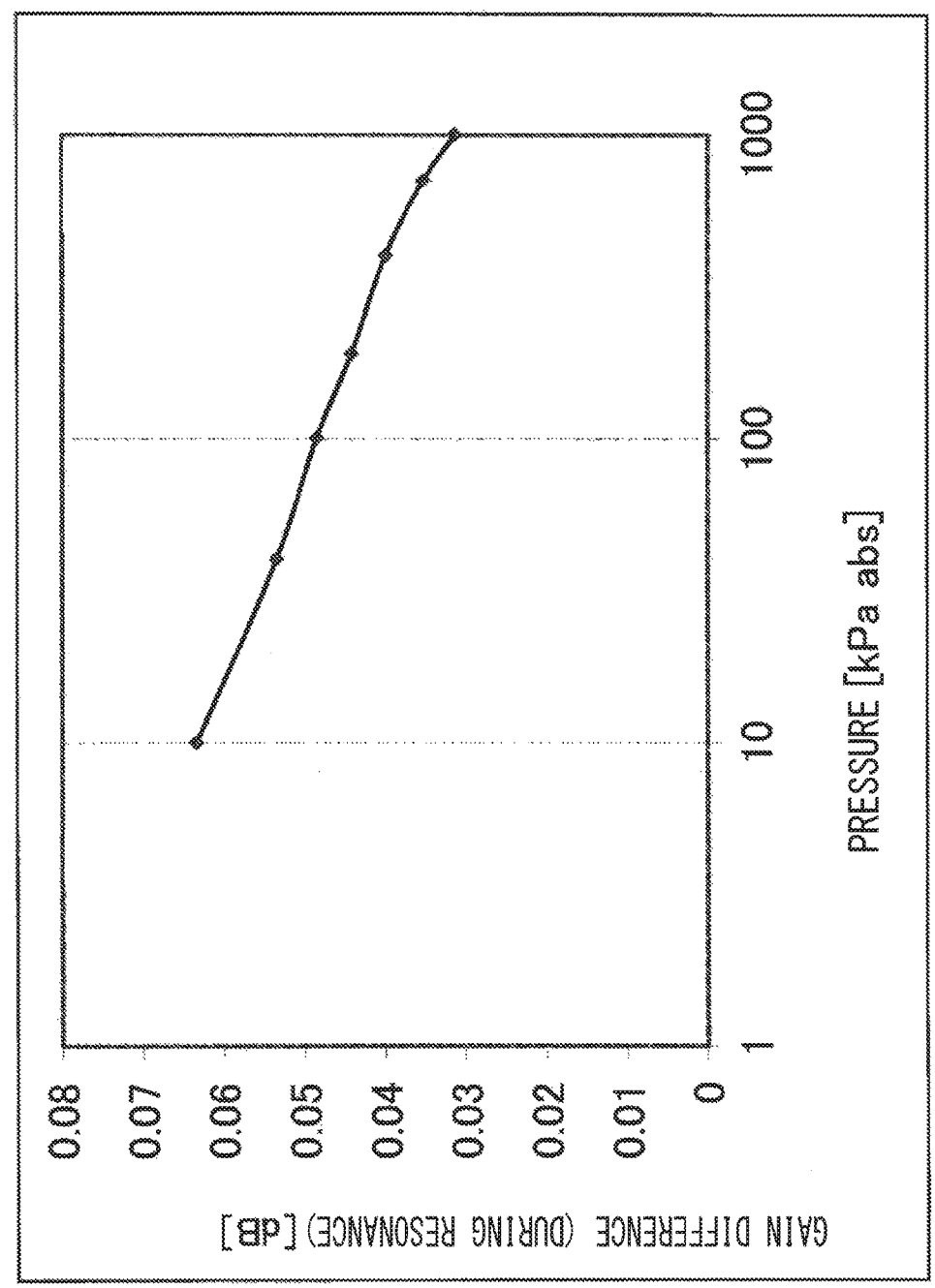
FIG. 8 is a view showing a relationship between gain difference and pressure.

FIG. 8 shows a relationship between gain difference and pressure. The gain difference means a difference between again during resonance in FIG. 7 and again at the frequency of 510 kHz. It can be found that the pressure and the gain difference have a certain relationship as shown in FIG. 8, which indicates that measurement of the pressure is possible with one pressure sensor 2 for all pressure regions: a subatmospheric pressure region (vacuum region), a pressure region around atmospheric pressure, and a pressure region higher than atmospheric pressure.

(Method of Manufacturing Pressure Sensor 2)

Figure 9:
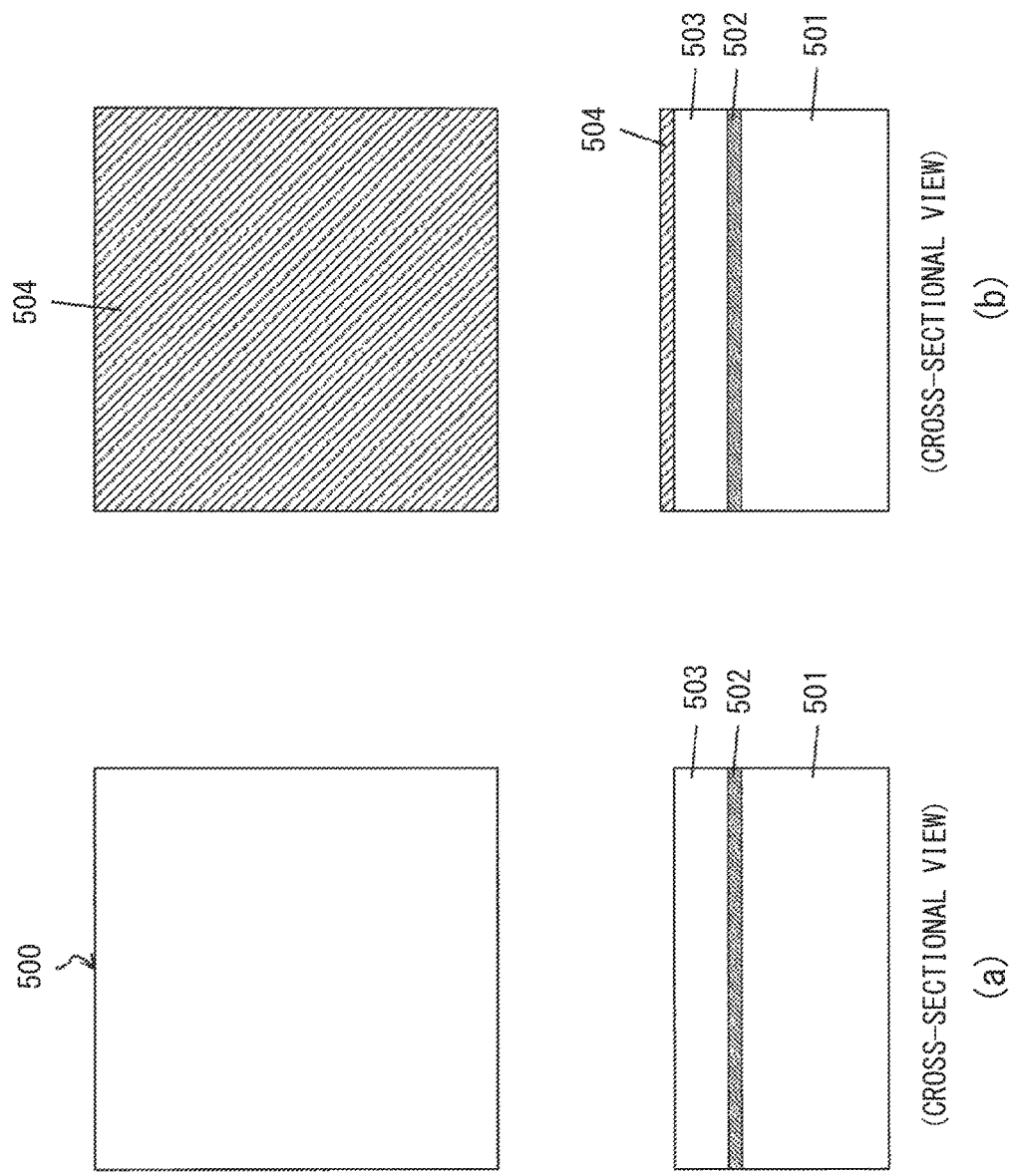
FIG. 9 is a view explaining a first step in a method of manufacturing the pressure sensor 2.
Figure 10:
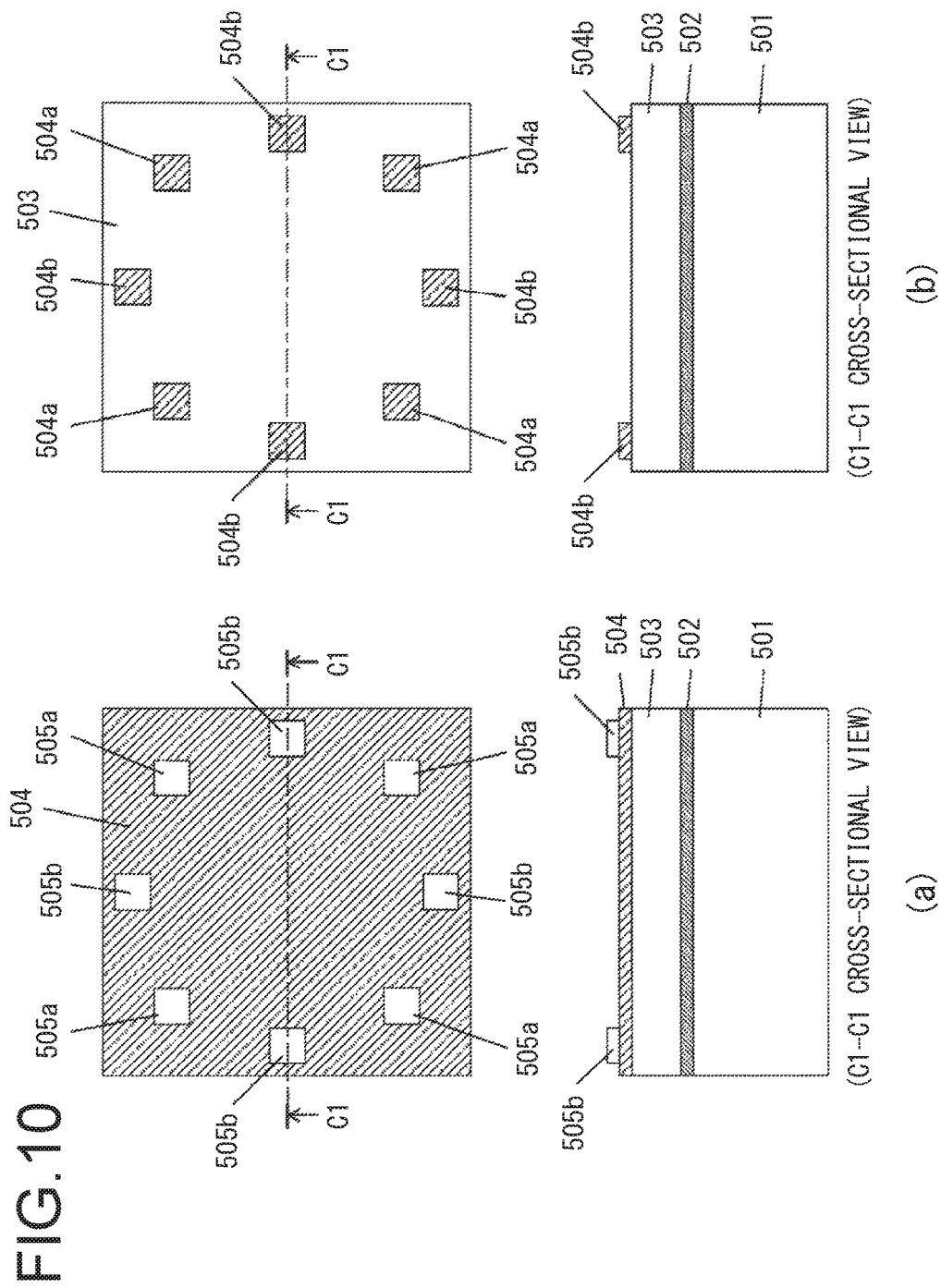
FIG. 10 is a view explaining second and third steps in the method of manufacturing the pressure sensor 2.

One example of a method of manufacturing the pressure sensor 2 will now be described, referring to process charts in FIGS. 9 to 14. In this embodiment, the pressure sensor 2 is formed by processing a SOI (Silicon on Insulator) wafer. First of all, a SOI wafer 500 as shown in FIG. 9(a) is prepared. The SOI water 500 is a substrate having a three-layer structure consisting of a Si layer 501 (hereinafter referred to as handle layer) that constitutes abuse substrate, a $SiO_2$ layer (hereinafter referred to as Box (Buried Oxide) layer) 502 that constitutes an intermediate layer, and a Si layer (hereinafter referred to as device layer) 503 that constitutes an upper layer. Here, the SOI wafer 500 including the handle layer 501 having a thickness of 400 μm, the BOX layer 502 having a thickness of 2 μm, and the device layer 503 having a thickness of 30 μm is used.

In a first step shown in FIG. 9(b), a $Si_3N_4$ film (layer) 504 is formed on an upper surface of the device layer 503 of the SOI wafer 500 by means of LPCVD. The $Si_3N_4$ 504 serves to prevent oxidation of a region where a pad is to be formed when the $SiO_2$ film is formed as described hereinafter.

In a second step shown in FIG. 10(a), photoresist patterns 505a, 505b for patterning the $Si_3N_4$ film 504 into a pad shape are formed by means of photolithography. The photoresist pattern 505a is a pattern corresponding to pads 211 of the ring oscillator 21 and the photoresist pattern 505b is a pattern corresponding to pads 221, 222, 231, 232 of the electrodes 22a, 22b and 23a, 23b.

In a third step shown in FIG. 10(b), the $Si_3N_4$ film 504 is etched by means of RIE (Reactive Ion Etching) using the photoresist patterns 505a, 505b as masks, in order to pattern the $Si_3N_4$ film 504 into a pad shape. As a result, the $Si_3N_4$ Film patterns 504a, 504b having the pad shape are formed on the device layer 503.

Figure 11:
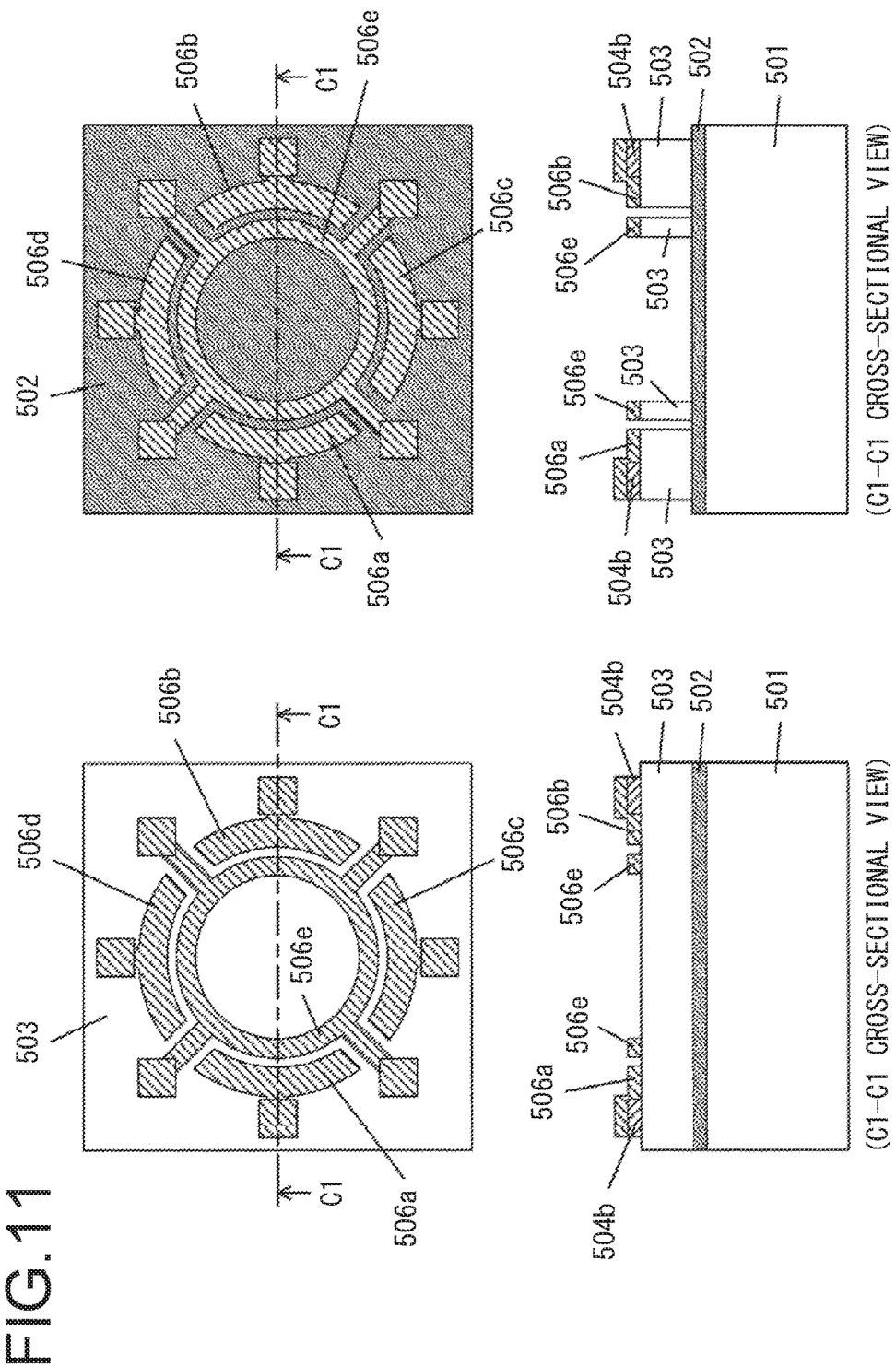
FIG. 11 is a view explaining fourth and fifth steps in the method of manufacturing the pressure sensor 2.
Figure 12:
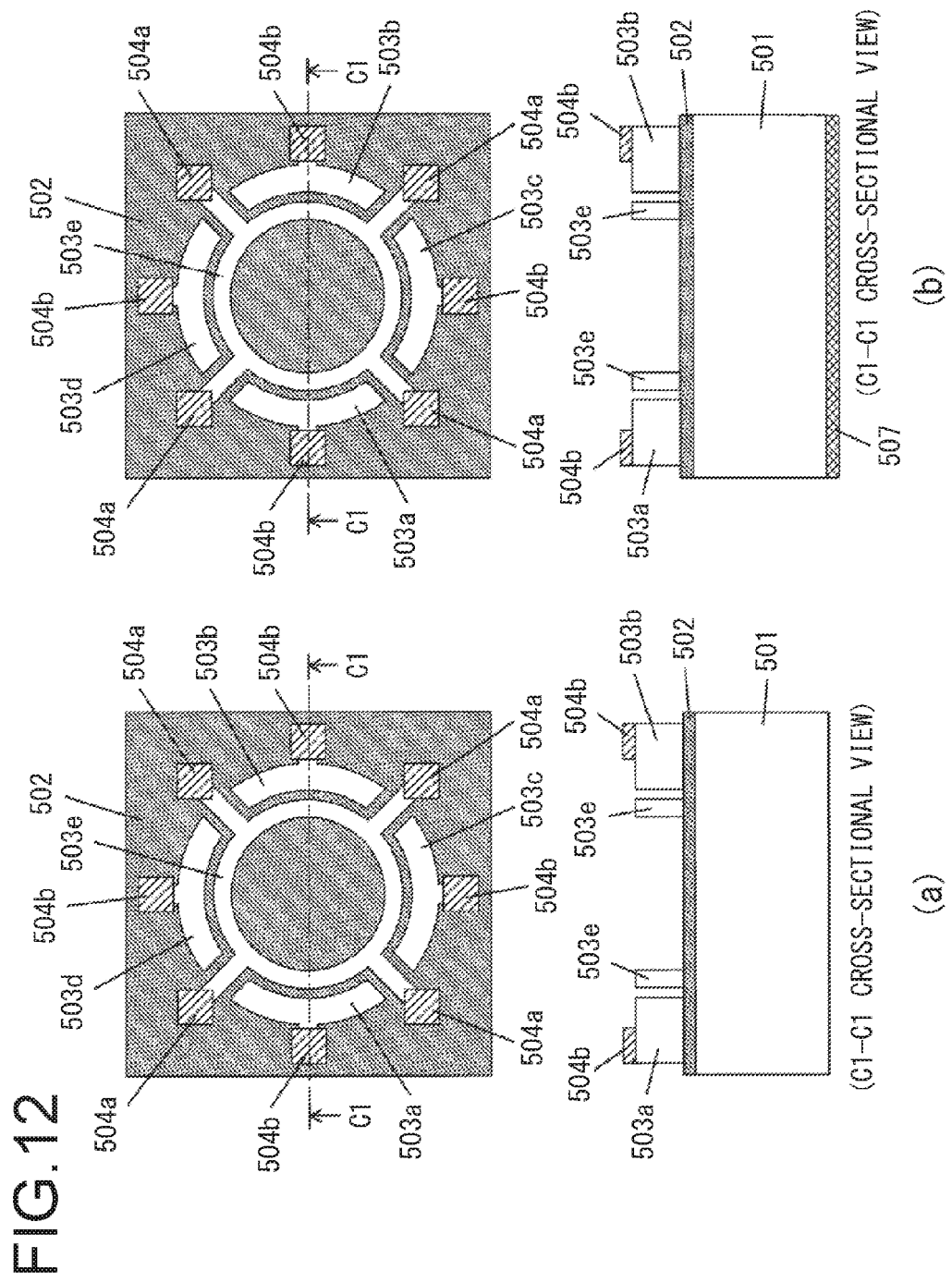
FIG. 12 is a view explaining sixth and seventh steps in the method of manufacturing the pressure sensor 2.
Figure 14:
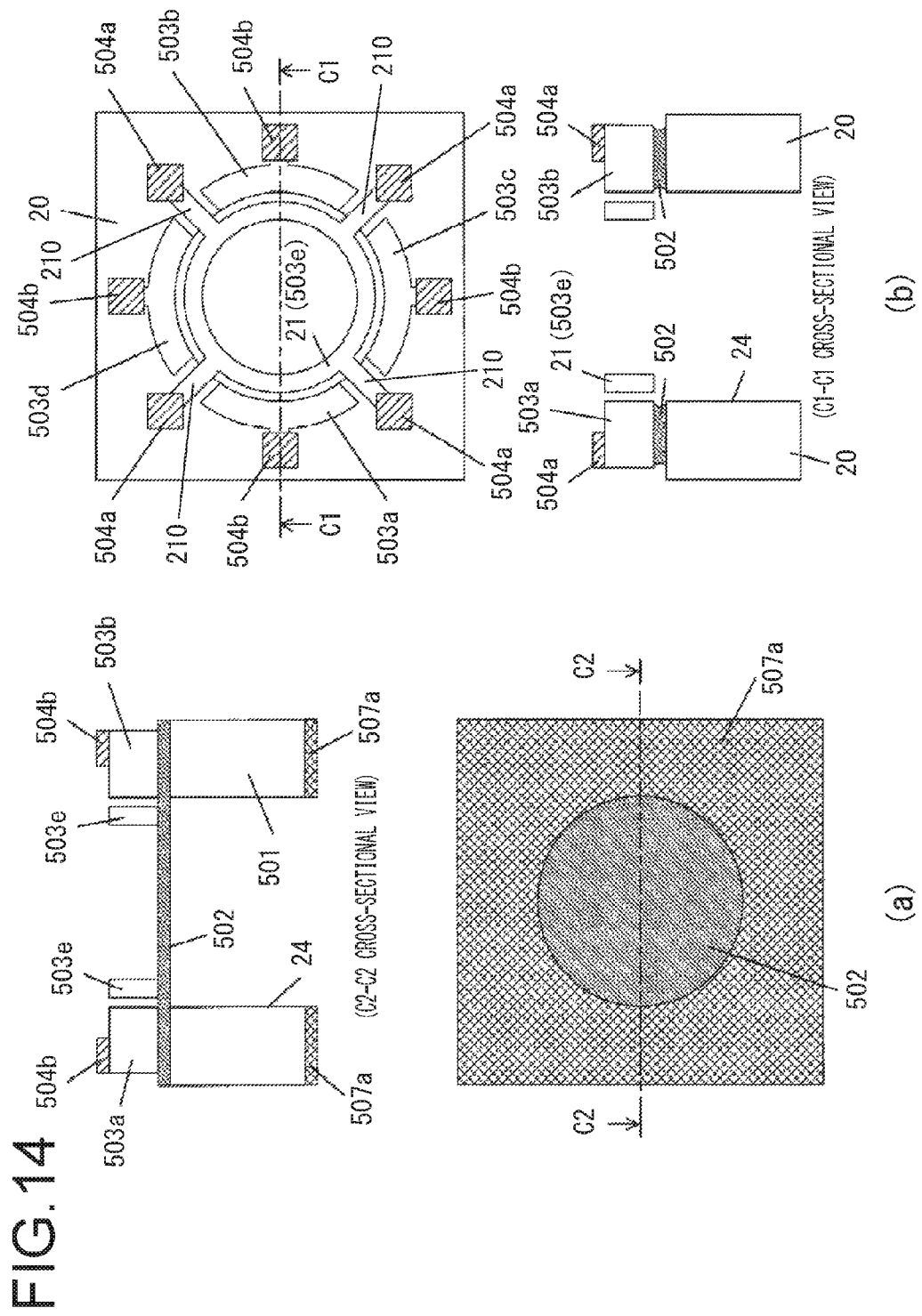
FIG. 14 is a view explaining tenth and eleventh steps in the method of manufacturing the pressure sensor 2.

In a fourth step shown in FIG. 11 (a), photoresist patterns 506a to 506e for patterning the device layer 503 into a shape of the electrodes 22a, 22b, 23a, 23b and the ring oscillator 21 by means of photolithography. The photoresist patterns 506a to 506d are patterns corresponding to the electrodes 22a, 22b, 23a, 23b and the photoresist pattern 506e is a pattern corresponding to the ring oscillator 21.

In a fifth step shown in FIG. 11(b), the device layer 503 is etched through to the BOX layer ($SiO_2$) 502 by means of Deep RIE using the photoresist patterns 506a to 506e. As a result, as shown in FIG. 12(a), the electrode patterns 503a to 503d and the ring oscillator pattern 503e, which are made of Si, are formed on the BOX layer ($SiO_2$) 502.

In a sixth step shown in FIG. 12(a), photoresist patterns 506a to 506e are removed. In a seventh step shown in FIG. 12(b), an Al film (layer) 507 for a mask is formed on a back side of the SOI wafer, i.e. a surface of the handle layer 501, by means of vacuum deposition.

In an eighth step shown in FIG. 13(a), a photoresist pattern 508 is formed by means of photolithography. In a ninth step shown in FIG. 13(b), the Al film 507 is etched with the photoresist pattern 508 as a mask, in order to form a photoresist pattern 507a (see FIG. 14(a)), The mask pattern 507a is a mask pattern for forming a through hole 24 (see FIG. 2).

In a tenth step shown in FIG. 14(a), after removing the photoresist pattern 508 on the mask pattern 507a, the handle layer 501 is etched through to the BOX layer ($SiO_2$) 502 by means of Deep RIE using the mask pattern 507a. As a result, the through hole 24 having a circular cross section is formed in the handle layer 501. In an eleventh step shown in FIG. 14(b), the BOX layer 502 is etched with BHF (buffered hydrofluoric acid) in order to remove an exposed part of the BOX layer 502. Only a region of the BOX layer 502 that is sandwiched by the handle layer 501 and the device layer 503 is not etched and remains. As a result, the ring oscillator 21 that is supported by the beams 210 is formed above the through hole 24.

(Forming of Electret Film)

After the pressure sensor 2 has been formed on the SOI wafer as described above, an electret film is formed with the $Si_3N_4$ film patterns 504a, 504b for oxidation protection having been formed on the pad. Although a corona discharging method in which charges are accumulated in an insulating film by the use of ions generated by corona discharging, a method utilizing ions generated by soft X-ray irradiation, and the like are known as methods of forming an electret film, a technology of manufacturing an electret film with a silicon oxide film containing potassium ions is employed in this embodiment in order to form the electret film 200e. The technology of manufacturing an electret film with a silicon oxide film containing potassium ions is described in detail in a non-patent literature "$SiO_2$ Electret Generated by Potassium Ions on a Comb-Drive Actuator" Applied Physics Express 4(2011), a patent literature Japanese Laid-Open Patent Publication No. 2013-13256, etc. This technology of manufacturing an electret film is suitable for the case in which the electret film is formed on side walls having a narrow gap.

Steps of forming the electret film 200e include a step of forming a silicon oxide film containing potassium ions on a surface of the pressure sensor 2 formed from the SOI wafer and a step of making the silicon oxide film containing potassium ions into an electret with a B-T procedure. First of all, the step of forming the silicon oxide film containing potassium ions will be described. As described above, after forming the ring oscillator 21, the electrodes 22a, 22b, 23a, 23b, and the like on the SOI wafer, the SOI wafer is loaded into an oxidation furnace to perform thermal oxidation with bubbling of KOH aqueous solution, instead of bubbling of $H_2O$ that is used in normal thermal oxidation. As a result, a $SiO_2$ layer 200 containing potassium ions therein is formed on the entire surface of the pressure sensor 2, except for the region where the $Si_3N_4$ film 504 described above is formed (see FIG. 3).

Then, a desired region of the thus formed $SiO_2$ layer 200 containing potassium ions is subjected to a B-T procedure in order to form the electret film 200e. In this embodiment, the electret film 200e is formed on each of the side surfaces of the electrodes 22a, 22b, 23a, 23b that are opposite to and faces to the ring oscillator 21. In the B-T procedure, the SOI wafer is heated to a temperature at which potassium ions can move and further a voltage is applied for moving potassium ions between the electrodes 22a, 22b, 23a, 23b and the ring oscillator 21. Specifically, the electrodes 22a, 22b, 23a, 23b in which the electret films are formed are connected to a ground side, while the ring oscillator 21 is connected to a positive side of the direct current voltage source. Then, after maintaining a voltage application state for a predetermined time, the temperature is lowered and then the voltage application is stopped.

As a result, the potassium ions 201 move to a surface of the $SiO_2$ layer 200 containing potassium ions formed in each electrode 22a, 22b, 23a, 23b, the surface being opposite to and facing to the ring oscillator 21, so that this region is made into an electret to become positively charged (see FIG. 3). On the other hand, negative Charges are induced to a surface of the ring oscillator 21 opposite to the electrodes 22a, 22b, 23a, 23b by the electric field of the electret film. As described above, when the dimension of the gap G is 2 µm, an electric field strength of approximately $1 \times 10^8$ V/m is generated by the electret film. It will be noted that the outer diameter of the ring oscillator 21 is 900 µm. One example of electret film manufacturing conditions is shown in FIG. 15.

In the embodiment described above, aside from the driving electrodes 22a, 22b, the detecting electrodes 23a, 23b are provided in order to detect the gain difference as pressure information. However, the pressure information is not limited to this. For example, the alternating current voltage may be regulated so that the resonance peak value becomes a predetermined value and the regulated amount may be used as the pressure information. In this case, the relationship between the regulated amount and the pressure value is previously prepared as a map. As can be seen from FIG. 7, it is possible to use peak frequency as the pressure information because the frequency at which the gain has its peak varies depending on the pressure.

Figure 16:
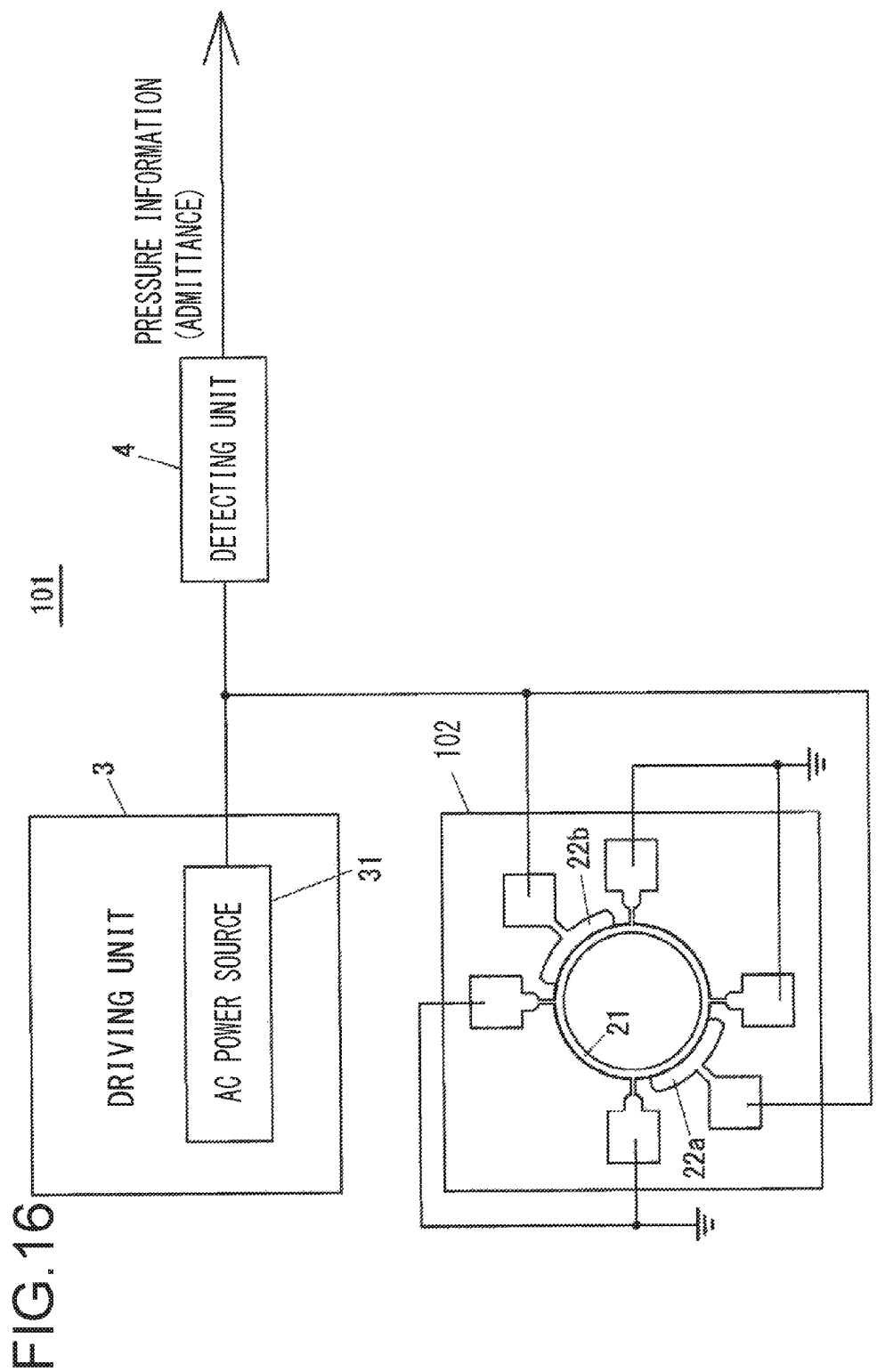
FIG. 16 is a view showing the pressure detection device 101 in the case of employing an admittance detecting scheme.

Additionally, as in the invention described in the Japanese Patent No. 4696244 described above, an admittance (specifically, absolute value |Y| of the admittance Y) may be detected as the pressure information. FIG. 16 shows the pressure detection device 101 in the case of employing an admittance detecting scheme and FIG. 17 shows a configuration of the pressure sensor 102 in that case.

Figure 17:
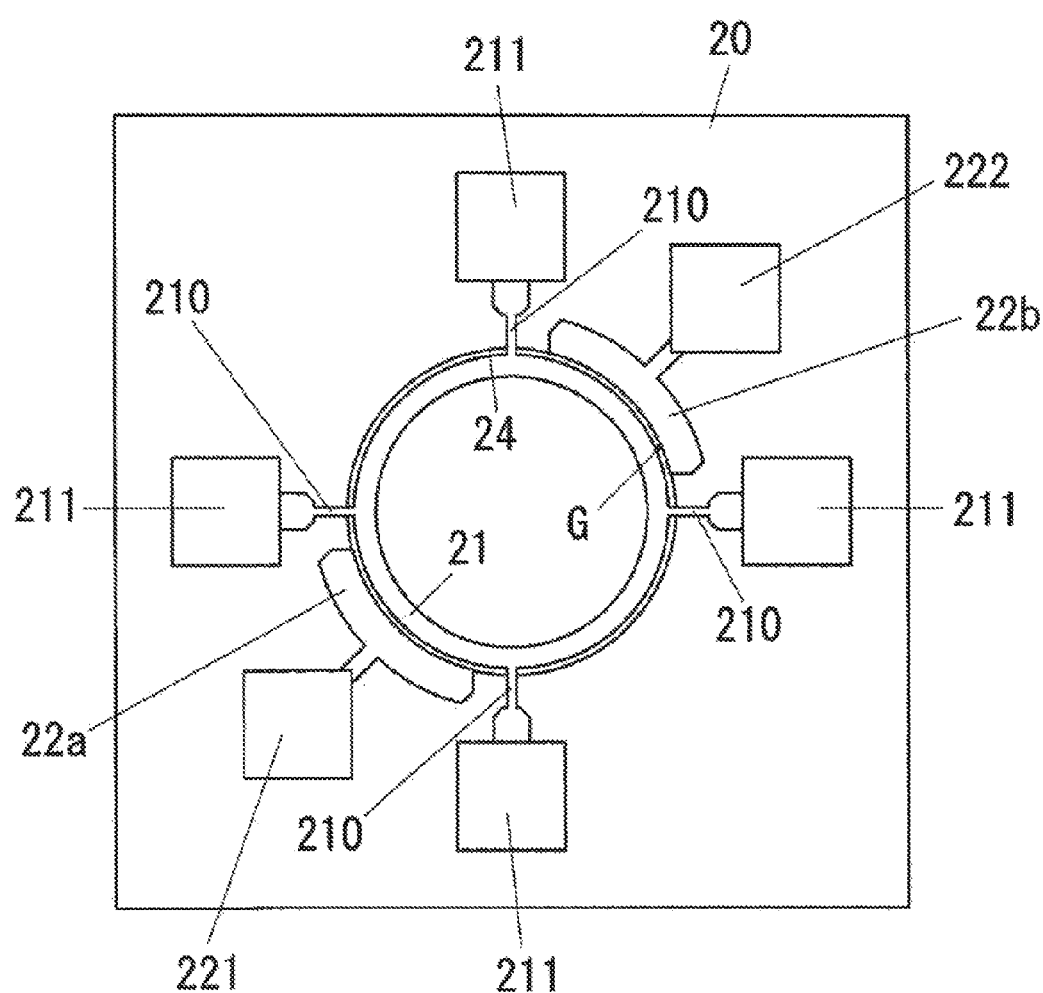
FIG. 17 is a view showing a configuration of the pressure sensor 102 in the case of employing the admittance detecting scheme.

As shown in FIG. 17, in the admittance detecting scheme, the detecting electrodes 23a, 23b are omitted and only the driving electrodes 22a, 22b are provided as electrodes. The configuration is otherwise the same as that of the pressure sensor 2 shown in FIG. 2. As shown in FIG. 16, the alternating current voltage is applied from the alternating current power source 31 to the driving electrodes 22a, 22b and the admittance value |Y| is detected by the detecting unit 4. Although a detailed description will be here omitted because it can be found in described in Japanese Patent No. 4696244, a change in pressure can be detected as a change in the admittance value |Y₀|.

It will be noted that although the detecting electrodes 23a, 23b are omitted in the configuration shown in FIG. 17, the pressure sensor 2 having the configuration shown in FIG. 2 can be applied as a pressure sensor in the pressure detection device 101 employing the admittance detecting scheme. In this case, the detecting electrodes 23a, 23b are not connected to the detecting unit 4, but still used as one of components that generates the squeeze film damping. Therefore, the electret film 200e may or may not be formed in the detecting electrodes 23a, 23b. In this case, the squeeze film damping effect still occurs also between the detecting electrodes 23a, 23b and the ring oscillator 21, which maintains an advantage of causing the squeeze film damping to occur along most of the whole circumference of the ring oscillator 21.

[Variations]

Figure 18:
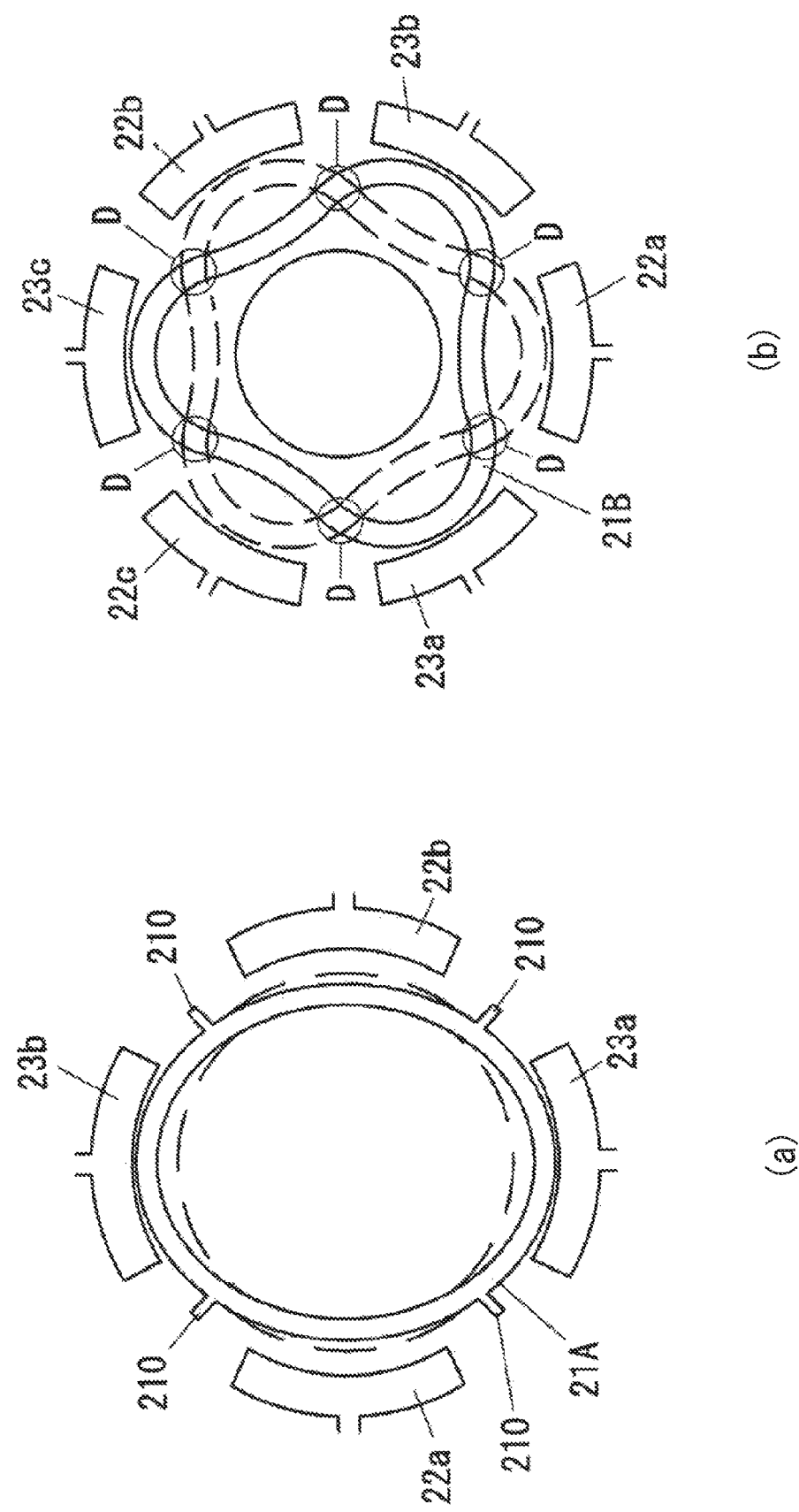
FIG. 18 is a view showing another example of the ring oscillator.
Figure 19:
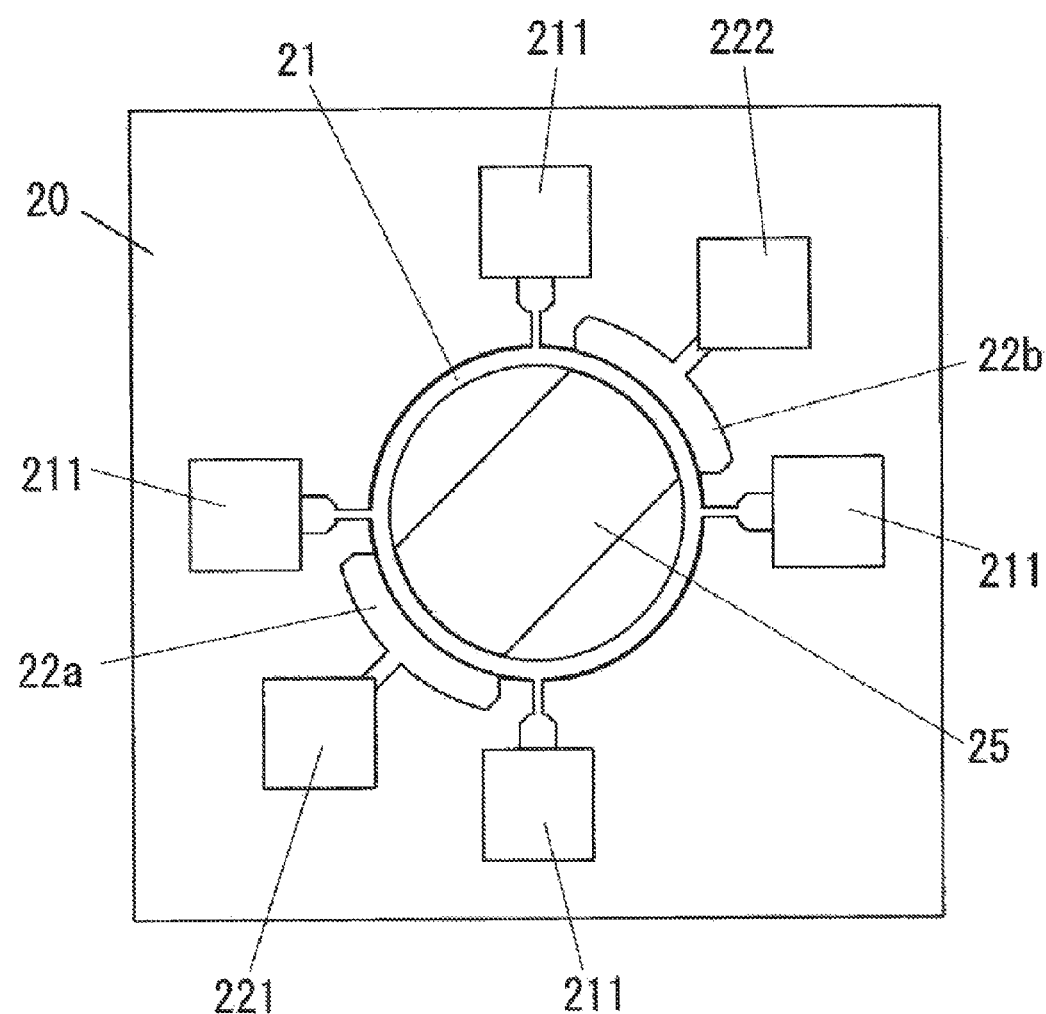
FIG. 19 is a view showing a configuration of the pressure sensor 103.

FIG. 18 and FIG. 19 are views showing variations of the pressure sensor. Although the ring oscillator 21 has an annular shape in the pressure sensors 2, 102 described above, the shape is not limited to the annular shape, but may be a shape shown in FIG. 18(a) or FIG. 18(b). The ring oscillator 21A shown in FIG. 18(a) has an oval ring shape. This oval ring shape is a shape of the ring oscillator 21 in the secondary oscillation mode and is the same as the second oval shape shown in FIG. 4(b). When an alternating current voltage is applied to the driving electrodes 22a, 22b, the ring oscillator 21A oscillates in the secondary oscillation mode, in which the ring oscillator 21A alternately takes the second oval shape and the first oval shape shown in FIG. 4.

The shape of the ring oscillator 21B shown in FIG. 18(b) is the same as the shape in the case in which the ring oscillator 21 oscillates in a tertiary oscillation mode. The outer shape is a generally triangular shape and apex parts are arranged with a pitch of 120 degrees around an axis. The detecting electrodes 23a to 23c are arranged at positions opposite to the apex parts, while the driving electrodes 22a to 22c are arranged with an offset of 60 degrees in relation to the detecting electrodes 23a to 23c in the anti-clockwise direction. When the alternating current voltage is applied to the driving electrodes 22a to 22c, the ring oscillator 21B oscillates in such a manner that a state denoted by a solid line and a state denoted by a dashed line are repeated. The driving electrodes 22a to 22c are arranged to be opposite to the apex parts in the state denoted by the dashed line. It will be noted that the number of the detecting electrodes may be one to three.

It will be noted that the beams 210 are connected at positions of nodes in the secondary oscillation mode in the configuration in FIG. 18(a), in the same manner as in FIG. 2. Also in FIG. 18(b), the beams (not shown) are connected at positions D of nodes in the tertiary oscillation mode. The resonance frequency in the tertiary oscillation mode is higher than that in the secondary oscillation mode.

As described above, the electrodes 22a to 22c, 23a to 23c, which are arranged to be opposite to the ring oscillator 21 with the gap G therebetween, not only function as electrodes, but also functions as members for generating the squeeze film damping. However, it may be also possible that, aside from the electrodes, members dedicated to the function of generating the squeeze film damping are arranged, such as the detecting electrodes 23a, 23b in the case of applying the pressure sensor 2 in FIG. 2 described above to the admittance detecting scheme.

It may be also possible that a damping generating member 25 is arranged on the inner circumferential side of the ring oscillator 21, as in the pressure sensor 103 shown in FIG. 19. The gap dimension in this case is set to be the same as the gap dimension in the driving electrodes 22a, 22b. Although the damping generating member 25 is arranged to be opposite to a part of the inner circumference of the ring oscillator 21 in FIG. 19, the damping generating member 25 may be arranged to be opposite to the entire inner circumference of the ring oscillator 21. Furthermore, the damping generating member 25 may be arranged at any position, so long as the position is opposite to a side surface that is located in the oscillating direction of the ring oscillator 21 (i.e. aside surface on the inner or outer circumferential side) and that is not opposite to the driving electrodes or the detecting electrodes. The larger the total opposite and facing area, the larger the squeeze film damping effect.

The electrodes 22a, 22b, 23a, 23b may also be provided on the inner circumferential side of the ring oscillator 21 in an inverse manner in relation to the case shown in FIG. 2.

As descried above, the pressure sensor in this embodiment includes: a base 20 as a fixed part; a ring oscillator 21 that is supported on the base 20 by a plurality of beams 210; a plurality of electrodes 22a, 22b, 23a, 23b that are arranged in the oscillating direction of the ring oscillator 21 with a gap G; and electret films 200e that are formed on surfaces of the plurality of electrodes 22a, 22b, 23a, 23b opposite to and facing to the ring oscillator 21, as shown in FIG. 2, for example. It will be noted that the electret films 200e may be formed either one of opposite surfaces of the ring oscillator 21 and the plurality of electrodes 22a, 22b, 23a, 23b, and the ring oscillator 21.

In the pressure sensor configured in this way, a higher direct current bias voltage equivalent can be applied by the electret films 200e, so that the ring oscillator 21 can be easily excited only by applying an alternating current voltage from outside to the driving electrodes 22a, 22b. Consequently, a superior power saving can be achieved in comparison to conventional pressure sensors having a configuration in which additional direct current voltage is applied from an external power source. Additionally, the pressure can be detected with a high sensitivity and further a reduction in size of the pressure sensor can be achieved because the squeeze film damping can be generated between the electrodes 22a, 22b, 23a, 23b and the ring oscillator 21. Therefore, this pressure sensor is optimal to be applied to pressure sensors where power saving and reduction in size are required, such as pressure sensors for monitoring tire air pressure or the like. Additionally, in the pressure sensor including the ring oscillator 21 as described above, the resonance frequency is very high as shown in FIG. 7. Therefore, this pressure sensor is hardly affected by external noise and thus has a superior noise tolerance.

It is preferable that the beams 210 support parts where nodes of oscillation of the ring oscillator 21 appear, while the electrodes 22a, 22b, 23a, 23b are arranged to be opposite to parts where antinodes of oscillation of the ring oscillator 21 appear.

The pressure in the region where the pressure sensor 2 is arranged can be detected by: providing two driving electrodes 22a, 22b and two detecting electrodes 23a, 23b in the pressure sensor 2; applying alternating current voltage to the driving electrodes 22a, 22b by the alternating current power source 31; detecting a voltage signal due to the oscillation of the ring oscillator 21 generated in the detecting electrodes 23a, 23b by the detecting unit 4; outputting pressure information based on the voltage signal from the detecting unit 4, as shown in FIG. 6. It will be noted that the number of the detecting electrodes may be one.

For example, the frequency of the alternating current voltage output from the alternating current power source 31 is swept in a frequency range of 510 kHz to 516 kHz in FIG. 7 and a difference between the level of the voltage signal detected in the resonance state and the level of the voltage signal detected in the non-resonance state (for example, a state in which the alternating current voltage having a frequency of 510 Hz is applied) is output from the detecting unit 4 as pressure information. Because there is the relationship as shown in FIG. 8 between the pressure and the above-described difference (gain difference), the pressure can be determined from the above-described difference. For example, the correspondence as shown in FIG. 8 may be previously stored as a map in the detecting unit 4, and the pressure that is determined using the above-described difference and the map may be output from the detecting unit 4 as pressure information.

It may be also possible that: the plurality of electrodes comprise the driving electrodes 22a, 22b; an alternating current voltage is applied to the driving electrodes 22a, 22b; an admittance of the electromechanically coupled system is detected, wherein the electromechanically coupled system includes the pressure sensor 2 to which the alternating current voltage is applied; and pressure information (for example, the absolute value |Y| of the admittance Y) based on the detected value is output from the detecting unit 4, as shown in FIG. 16.

The above-described embodiments may be used alone or in combination. This is because effects of respective embodiments can be achieved alone or in synergy with each other. Additionally, the present invention is not limited to the foregoing embodiments, unless impairing the features of the present invention.

The disclosure of the following priority application is herein incorporated by reference:

Japanese Patent Application No. 2013-222151 (filed Oct. 25, 2013)

REFERENCE SIGNS LIST 1, 101: pressure detection device, 2, 102, 103: pressure sensor, 20: base, 21, 21A, 21B: ring oscillator, 22a, 22b: driving electrode, 23a, 23b: detecting electrode, 200e: electret film, 201: potassium ions, 210: beam, G: gap

The invention claimed is:

1. A pressure sensor comprising:
a fixed part;
a ring-like oscillator that is supported on the fixed part by a plurality of support beams;
a plurality of electrodes that are provided on the fixed part and arranged in an oscillating direction of the ring-like oscillator with a gap; and
electret films that are formed on either one of opposite surfaces of the ring-like oscillator and the electrodes.

2. The pressure sensor according to claim 1, wherein:
the ring-like oscillator has an annular shape.

3. The pressure sensor according to claim 1, wherein:
the support beams support parts where nodes of oscillation of the ring-like oscillator appear; and
the plurality of electrodes are arranged to be opposite to parts that antinodes of oscillation of the ring-like oscillator appear.

4. A pressure detection device comprising:
the pressure sensor according claim 1, wherein:
the plurality of electrodes provided in the pressure sensor include two or more driving electrodes and one or more detecting electrode;
there is provided a power source that applies an alternating current voltage to the driving electrodes; and
there is provided a pressure calculating unit that detects a voltage signal due to oscillation of the ring-like oscillator generated in the detecting electrode and outputs pressure information based on the voltage signal.

5. The pressure detection device according to claim 4, wherein:
the power source applies an alternating current voltage in a predetermined frequency range to the driving electrodes; and
the pressure calculating unit outputs a difference between a level of the voltage signal detected in a resonance state and a level of the voltage signal detected in a non-resonance state as the pressure information.

6. A pressure detection device comprising:
the pressure sensor according to claim 1;
a power source that applies an alternating current voltage to the plurality of electrodes; and
a pressure calculating unit that detects an admittance of an electromechanically coupled system including the pressure sensor to which the alternating current voltage is applied and outputs pressure information based on a value of the detected admittance.

7. The pressure sensor according to claim 2, wherein:
the support beams support parts where nodes of oscillation of the ring-like oscillator appear; and
the plurality of electrodes are arranged to be opposite to parts that antinodes of oscillation of the ring-like oscillator appear.

8. A pressure detection device comprising:
the pressure sensor according to claim 2, wherein:
the plurality of electrodes provided in the pressure sensor include two or more driving electrodes and one or more detecting electrode;
there is provided a power source that applies an alternating current voltage to the driving electrodes; and
there is provided a pressure calculating unit that detects a voltage signal due to oscillation of the ring-like oscillator generated in the detecting electrode and outputs pressure information based on the voltage signal.

9. A pressure detection device comprising:
the pressure sensor according to claim 3, wherein:
the plurality of electrodes provided in the pressure sensor include two or more driving electrodes and one or more detecting electrode;
there is provided a power source that applies an alternating current voltage to the driving electrodes; and
there is provided a pressure calculating unit that detects a voltage signal due to oscillation of the ring-like oscillator generated in the detecting electrode and outputs pressure information based on the voltage signal.

10. A pressure detection device comprising:
the pressure sensor according to claim 7, wherein:
the plurality of electrodes provided in the pressure sensor include two or more driving electrodes and one or more detecting electrode;
there is provided a power source that applies an alternating current voltage to the driving electrodes; and
there is provided a pressure calculating unit that detects a voltage signal due to oscillation of the ring-like oscillator generated in the detecting electrode and outputs pressure information based on the voltage signal.

11. The pressure detection device according to claim 8, wherein:
the power source applies an alternating current voltage in a predetermined frequency range to the driving electrodes; and
the pressure calculating unit outputs a difference between a level of the voltage signal detected in a resonance state and a level of the voltage signal detected in a non-resonance state as the pressure information.

12. The pressure detection device according to claim 9, wherein:
the power source applies an alternating current voltage in a predetermined frequency range to the driving electrodes; and
the pressure calculating unit outputs a difference between a level of the voltage signal detected in a resonance state and a level of the voltage signal detected in a non-resonance state as the pressure information.

13. The pressure detection device according to claim 10, wherein:
the power source applies an alternating current voltage in a predetermined frequency range to the driving electrodes; and
the pressure calculating unit outputs a difference between a level of the voltage signal detected in a resonance state and a level of the voltage signal detected in a non-resonance state as the pressure information.

14. A pressure detection device comprising:
the pressure sensor according to claim 2;
a power source that applies an alternating current voltage to the plurality of electrodes; and
a pressure calculating unit that detects an admittance of an electromechanically coupled system including the pressure sensor to which the alternating current voltage is applied and outputs pressure information based on a value of the detected admittance.

15. A pressure detection device comprising:
the pressure sensor according to claim 3;
a power source that applies an alternating current voltage to the plurality of electrodes; and
a pressure calculating unit that detects an admittance of an electromechanically coupled system including the pressure sensor to which the alternating current voltage is applied and outputs pressure information based on a value of the detected admittance.

16. A pressure detection device comprising:
the pressure sensor according to claim 7;
a power source that applies an alternating current voltage to the plurality of electrodes; and
a pressure calculating unit that detects an admittance of an electromechanically coupled system including the pressure sensor to which the alternating current voltage is applied and outputs pressure information based on a value of the detected admittance.

* * * * *